US007248973B2

(12) United States Patent
Minor

(10) Patent No.: US 7,248,973 B2
(45) Date of Patent: Jul. 24, 2007

(54) METRICS FOR CHARACTERIZING CHEMICAL ARRAYS BASED ON ANALYSIS OF VARIANCE (ANOVA) FACTORS

(75) Inventor: James M. Minor, Los Altos, CA (US)

(73) Assignee: Agilent Technologies, Inc., Santa Clara, CA (US)

( * ) Notice: Subject to any disclaimer, the term of this patent is extended or adjusted under 35 U.S.C. 154(b) by 0 days.

(21) Appl. No.: 11/198,362

(22) Filed: Aug. 4, 2005

(65) Prior Publication Data

US 2005/0273273 A1 Dec. 8, 2005

Related U.S. Application Data

(63) Continuation-in-part of application No. 11/026,484, filed on Dec. 30, 2004, and a continuation-in-part of application No. 10/422,570, filed on Apr. 23, 2003.

(60) Provisional application No. 60/375,251, filed on Apr. 23, 2002.

(51) Int. Cl.
*G06F 19/00* (2006.01)

(52) U.S. Cl. ...................................... 702/32

(58) Field of Classification Search .................. 702/19, 702/32, 34, 22, 181–183, 185, 30, 187, 189; 435/6; 716/16; 703/12
See application file for complete search history.

(56) References Cited

U.S. PATENT DOCUMENTS

| 5,860,917 | A | 1/1999 | Comanor et al. |
|---|---|---|---|
| 5,948,902 | A | 9/1999 | Honkanen et al. |
| 6,171,797 | B1 | 1/2001 | Perbost |
| 6,180,351 | B1 | 1/2001 | Cattell |
| 6,188,969 | B1 | 2/2001 | Minor |
| 6,221,583 | B1 | 4/2001 | Kayyem et al. |
| 6,222,664 | B1 | 4/2001 | Dorsel |
| 6,232,072 | B1 | 5/2001 | Fisher |
| 6,242,266 | B1 | 6/2001 | Schleifer et al. |
| 6,251,685 | B1 | 6/2001 | Dorsel et al. |
| 6,320,196 | B1 | 11/2001 | Dorsel et al. |
| 6,323,043 | B1 | 11/2001 | Caren et al. |
| 6,355,921 | B1 | 3/2002 | Staton et al. |
| 6,371,370 | B2 | 4/2002 | Sadler et al. |
| 6,406,849 | B1 | 6/2002 | Dorsel et al. |

(Continued)

OTHER PUBLICATIONS

Churchill., Using ANOVA to Analyze Microarray Data. pp. 173-175, and 177. vol. 37, No. 2, 2004.

(Continued)

*Primary Examiner*—Bryan Bui

(57) ABSTRACT

Methods, systems and computer readable media for producing a metric to characterize a chemical array. Effects of terms impacting results of measurement of an output generated from analysis of the array or a procedure performed using the array, are quantified by performing ANOVA analysis and calculating sums of squares quantities attributable to each of the terms respectively. A metric is derived from at least two of the calculated sum of squares quantities. Methods systems and computer readable media for characterizing one or more chemical arrays may perform the steps of querying a database storing sums of squares quantities quantifying effects of terms impacting results of measurements of outputs generated from a plurality of chemical arrays; selecting sums of squares quantities based on the querying; and generating a metric based on the at least two sums of squares quantities.

25 Claims, 7 Drawing Sheets

U.S. PATENT DOCUMENTS

| | | |
|---|---|---|
| 6,486,457 B1 | 11/2002 | Dorsel et al. |
| 6,518,556 B2 | 2/2003 | Staton et al. |
| 2004/0180365 A1* | 9/2004 | David .................... 435/6 |

OTHER PUBLICATIONS

Johnson et al., "Continuous Univariate Distributions," vol. 1, 2nd., John Wiley & Sonces, Inc. (Title and Table of Contents). New York, 1994.

Huber., "Robust Statistics," John Wiley & Sonces, Inc. (Title and Table of Contents). NewYork, 1981.

http://www.itl.nist.gov/div898/handbook/pri/section3/pri336.htm, "Responses surface desgins", Section 5.3.3.6, downloaded Apr. 16, 2006.

http://www.itl.nist.gov/div898/handbook/pri/section4/pri473.htm, "Response surface model example", Section 5.4.7.3, downloaded Apr. 16, 2003.

http://www.mcclurenet.com/EMEA_PDFs/Q2a.pdf, European Agency for the Evaluation of Medicinal Products, Human Medicines Evaluation Unit, "Validation of Analytical Procedures: Methodology", Step 4, Consensus Guideline, Nov. 6, 1996.

Bittner et al. Molecular classification of cutaneous malignant melanoma by gene expression profiling.(pp. 536-540), Nature vol. 406 Aug. 3, 2000.

Donna K. Slonim. From patterns to pathways: gene expression data analysis comes of age. pp. (502-508), Nature genetics supplement. vol. 32.Dec. 2002.

Luo et al. Human Prostate Cancer and Benign Prostatic Hyperlasia: Molecular Dissection by Gene Expression Profiling. (pp. 4683-4688), Cancer research 61, Jun. 15, 2001.

Tseng et al. Issues in cDNA microarray analysis: quality filtering, channel normalization, models of variations and assessment of gene effects. (pp. 2549-2557), Nucleic Acids Research, 2001, vol. 29, No. 12.

Minor, James M. et al., "Analysis of Clinical Data Using Neural Nets", J. Biopharmaceutical Statistics, 6(1), 83-104 1996.

Hobbs et al., "FASTUS: A Cascaded Finite-State Transducer for Extracting Information form Natural-Language Text", http://www.ai.sri.com/natural-language/projects/fastus.html, 1993.

Marquardt, "An Algorithm for Least-Squares Estimation of Non-linear Parameters", J. Soc Indust Appl Math vol. II, No. 2, USA pp. 431-441,Jun. 1963.

Diamantaras et al., Principal Component neural Networks, Theory and Applications John Wiley & Sons, Inc., pp. 146-157. 1996.

Manning & Schutze, Foundations of Statistical Natural Language Processing, MIT Press, 1st ed., 1999, pp. xxix-xxxiii.

Minor et al., "Use of Neural networks to Analyze Drug Combination Interactions", submitted to COMCON 4, 4th International Conference on Advances in Communication & Control Proceedings, pp. 504-515, 1993.

Minor et al. , "Neural Net Methods for Mapping Thermodynamic and Physical Properties in Environmental Problems", Abstract submitted to 1996 AIChE Spring National Meeting, New Orleans, LA, Feb. 25-29, 1996.

Minor et al., "Competetive Advantage via Advanced Technology: neural Networks and Quality Control", Abstract and Article submitted to 1995 Quality Control Conference, Santa Clara, CA, Apr. 4-7, 1995.

http://www2.chass.ncsu.edu/garson/pa765/anova.htm, ANOVA.

http://mathworld.wolfram.com/ConjugateGradientMethod.html, 1996.

* cited by examiner $$100 \diagdown \overbrace{\begin{matrix} & 1 & 2 & 3 & 4 & & m \end{matrix}}^{110} \overbrace{\begin{matrix} m+1 & & n \end{matrix}}^{120}$$

$$\begin{matrix} 1 \\ 2 \\ 3 \\ \vdots \\ P \end{matrix} \begin{bmatrix} 1 & 0 & 0 & 0 & \cdots & 0 & X_{1,m+1} & \cdots & X_{1,n} \\ 0 & 1 & 0 & 0 & \cdots & 0 & X_{2,m+1} & \cdots & X_{2,n} \\ 0 & 0 & 1 & 0 & \cdots & 0 & X_{3,m+1} & \cdots & X_{3,n} \\ \vdots & \vdots & \vdots & \vdots & \vdots & \vdots & \vdots & & \vdots \\ 0 & 0 & 0 & 0 & \cdots & 1 & X_{P,m+1} & \cdots & X_{P,n} \end{bmatrix}$$

FIG. 2

$$100 \diagdown \overbrace{M,1}\ \overbrace{M,2}\ \overset{X}{\overbrace{M,q-1}}\ \overbrace{M,q}\quad Y\quad \diagup 200$$

$$\begin{matrix} 1 \\ 2 \\ 3 \\ \vdots \\ P \end{matrix} \begin{bmatrix} 1 & 0 & 0 & 0 & \cdots & 0 & X_{1,m+1} & \cdots & X_{1,n} \\ 0 & 1 & 0 & 0 & \cdots & 0 & X_{2,m+1} & \cdots & X_{2,n} \\ 0 & 0 & 1 & 0 & \cdots & 0 & X_{3,m+1} & \cdots & X_{3,n} \\ \vdots & \vdots & \vdots & \vdots & \vdots & \vdots & \vdots & & \vdots \\ 0 & 0 & 0 & 0 & \cdots & 1 & X_{P,m+1} & \cdots & X_{P,n} \end{bmatrix} \begin{bmatrix} y_{1,1} & \cdots & y_{1,t} \\ y_{2,1} & \cdots & y_{2,t} \\ & \cdots & \\ \vdots & \vdots & \vdots \\ y_{P,1} & \cdots & y_{P,t} \end{bmatrix}$$

FIG. 3

Using pop='pos' to be
the positive level
Area Under Curve=0.60401

METRICS FOR CHARACTERIZING CHEMICAL ARRAYS BASED ON ANALYSIS OF VARIANCE (ANOVA) FACTORS

CROSS-REFERENCE

This application is a continuation-in-part application of application Ser. No. 11/026,484, filed Dec. 30, 2004 and this application is a continuation-in-part application of application Ser. No. 10/422,570, filed Apr. 23, 2003, which also claims priority under 35 U.S.C. Section 119 to Application Ser. No. 60/375,251 filed Apr. 23, 2002. Each of application Ser. Nos. 11/026,484, 10/422,570 and 60/375,251 are hereby incorporated herein, in their entireties, by reference thereto, and we claim priority under 35 USC §120 to application Ser. Nos. 11/026,484 and 10/422,570; and under 35 U.S.C. Section 119 to Application Ser. No. 60/375,251.

BACKGROUND OF THE INVENTION

Researchers use experimental data obtained from microarrays and other similar research test equipment to cure diseases, develop medical treatments, understand biological phenomena, and perform other tasks relating to the analysis of such data. However, the conversion of useful results from this raw data is restricted by physical limitations of, e.g., the nature of the tests and the testing equipment. All biological measurement systems leave their fingerprint on the data they measure, distorting the content of the data, and thereby influencing the results of the desired analysis. For example, systematic biases can distort microarray analysis results and thus conceal important biological effects sought by the researchers. Biased data can cause a variety of analysis problems, including signal compression, aberrant graphs, and significant distortions in estimates of differential expression. Types of systematic biases include gradient effects, differences in signal response between channels (e.g., for a two-channel system), variations in hybridization or sample preparation, pen or nozzle shifts during array manufacture (e.g., using an inject printer), subarray variation, and differences in RNA inputs.

Gradient effects are those in which there is a pattern of expression signal intensity which corresponds with specific physical locations within the chip (e.g., array substrate) and which are characterized by a smooth change in the expression values from one end of the chip to another. This can be caused by variations in chip design, manufacturing, and/or hybridization procedures. FIG. 1 shows an example of distortion caused by gradient effects, where it can be observed that the signal intensity shows a gradually increasing pattern moving from a first edge 10 (see corresponding signals 20) to a second edge 12 (corresponding signals 22) of the chip.

In dual-channel systems the two dyes do not always perform equally efficiently, for equivalent RNA concentrations, uniformly across the whole microarray. In particular, the red channel often demonstrates higher signal intensity than the green channel at higher RNA abundances.

Variations in hybridization and sample preparations can cause warpage to occur in the expression values in microarrays. This can prevent comparative analysis across batches of arrays and further distort analysis results.

Subarray variations are forms of systematic biases in which different probe subsets within the chip demonstrate significantly different performance characteristics. In particular, there may be multiple subsets that have different average signal intensities. This is sometimes referred to as "blocking" within the resultant array pattern, due to the visual, block-like appearance resultant when the subset includes probes that are adjacent to each other. These subarray variations may be related to individual pens/nozzles of an inkjet used to print the array, or other manufacturing component discreteness or boundaries (for example, when two array patterns are intersected to create higher probe density, there may be a shift between the two patterns), as well as other process details and are typically causally represented as ANOVA nominal variables.

Device distortions/variations aside, other problems facing researchers are the tasks of quality control and assessment of microarray measurements. Because they are often performed manually and heuristically, these tasks are time-consuming, expensive, and prone to error.

Because of the large amount of data involved, inspection and review of microarray results is complex and tedious, requiring knowledge of multiple microarray technology platforms and manufacturing techniques. Review of microarray data is also time-consuming and costly because, using manual inspection, 40%-50% of all hybridized microarrays typically require at least one interpretation of the acceptability of the results. Thorough inspection at these levels becomes cost prohibitive as the number of hybridizations performed per week increases into the hundreds or thousands.

In addition, manual review of microarray data is imprecise and inconsistent. Agreement between research scientists is frequently less than 60%. To avoid systematic shifts in an inspector's judgment over time, inspectors must constantly be "re-calibrated" (i.e., re-trained) to their own previous judgments as well as to the judgments of others. Moreover, marginal cases are difficult to flag. As the volume of hybridizations increases, identification of marginal cases or close calls becomes difficult. These cases may require more detailed study or expert opinions to properly classify and quantify results. Lastly, heuristic thresholds are often set on quality control parameters. Thresholds on quality control parameters are frequently set independently for each parameter without statistical adjustment for the multiplicity of tests being performed. This leads to increased failure rates and increased costs.

Analysis of variance (ANOVA) is used to uncover the main and interaction effects of categorical independent variables (sometimes referred to as "factors") on a dependent variable based on a functional association. Categorical dependent variables may also be supported. A "main effect" is the individual effect of an independent variable on the dependent variable, a combinatorial impact. A more extensive discussion of existing ANOVA techniques can be found at http://www2.chass.ncsu.edu/garson/pa765/anova.htm. A copy of this document which was downloaded on Nov. 5, 2004 and is being submitted as a disclosure document in this application, is hereby incorporated herein, in its entirety, by reference thereto.

Multivariate, or N-way ANOVA addresses N independent factor variables. As the number of independent variables increases, the number of potential interactions proliferates. For example, the consideration of two independent variables A and B considers only a single first-order interaction (AB). Consideration of three independent variables A, B and C requires analysis of three second-order interactions (AB, AC, BC) and one third-order interaction (ABC). Consideration of four independent variables requires a consideration of six second order (AB, AC, AD, BC, BC, CD), three third-order (ABC, ACD, BCD), and one fourth-order (ABCD) interaction, or ten interactions in all. As the number of interactions increases, it becomes increasingly difficult to calculate the model estimates. Even for models having only a few ANOVA variables, the same problems may be experienced when there are many nominal or ordinal levels to one or more of the variables.

Analysis of variance in biological applications, for example, typically present vary large numbers of variables, making it extremely difficult, time consuming and costly to calculate results. Depending upon the characterizations of the variables, it may be practically impossible to apply current analysis of variable techniques and expect to achieve results because of the enormity of the calculations required. For example, in applications such as genomics, it is not atypical to be faced with data-analysis problems involving multiple categorical variables that can have tens of thousands of levels, such as gene names or probe designations, as just two examples of many. Interactions among such variables may produce tens of millions of data columns. Such columns for this example, however, tend to be sparse in that the variables mentioned can be represented as nominal variables. Large matrices of columns sparsely populated by data can typically be reduced to smaller matrices, especially when there is some pattern in the sparsely populated data columns that can be identified. The smaller matrices are much more computationally manageable, making analysis of variance techniques practically useable when only nominal variables are being considered.

However, when considering factors that reflect process conditions associated with processing the probes, these factors are represented by variables that are categorical (class) variables, such as ordinal or nominal and scaled variables with a continuum of levels, the data columns of which are typically non-sparse. The inclusion of non-sparse data columns into a matrix to be analyzed by least squares optimization makes it impossible to reduce the matrix size by any effective amount, leaving enormous numbers of calculations to be performed. Statistical analysis by well-known software products, such as JMP*SAS (http://www.jmp.com/) and SAS, for example, can take days to process such data due to limitations in memory and CPU speed on a typical computer running the software.

There is a continuing need for tools to characterize chemical arrays for quality control purposes, as well as for comparing results among arrays.

SUMMARY OF THE INVENTION

Methods, systems and computer readable media are provided for producing a metric to characterize a chemical array. In one embodiment, the methods, systems and computer readable media are used to quantify effects of terms impacting (effecting) results of measurement of an output generated from analysis of the array or a procedure performed using the array, by performing ANOVA analysis and calculating sums of squares quantities attributable to each of the terms respectively; and generating a metric from at least two of the sum of squares quantifies.

Methods, systems and computer readable media are provided for characterizing one or more chemical arrays. In one embodiment, a database storing sums of squares quantities quantifying effects of terms impacting results of measurements of outputs generated from a plurality of chemical arrays is queried, and at least two sums of squares quantities resulting from the querying are selected. A metric based on the at least two sums of squares quantities is then generated to characterize one or more chemical arrays.

In another embodiment, methods, systems and computer readable media for correcting an ROC curve characterizing a contaminated population of positive data points are provided, to include: assigning a weighting factor of one to each data point in a negative population considered for plotting the ROC curve; assigning a weighting factor to each data point in the positive population, ranging from zero to one based on a probability of each data point in the positive population being a true positive; multiplying the weighting factors by ROC curve values generated; and plotting a corrected ROC curve.

These and other advantages and features of the invention will become apparent to those persons skilled in the art upon reading the details of the methods, systems and computer readable media as more fully described below.

BRIEF DESCRIPTION OF THE DRAWINGS

FIG. 2 is a schematic representation of a matrix representing large numbers of nominal variables and also some scaled and/or ordinal variables to be considered for analysis of variance. For purposes of practicality, given the limitations of the drawing, only one nominal (i.e., ANOVA) variable is shown having m levels.

FIG. 3 shows binning of the columns of the matrix of FIG. 2, as well as an outputs or measurements matrix Y with multiple different Y columns.

DETAILED DESCRIPTION OF THE INVENTION

Figure 1:
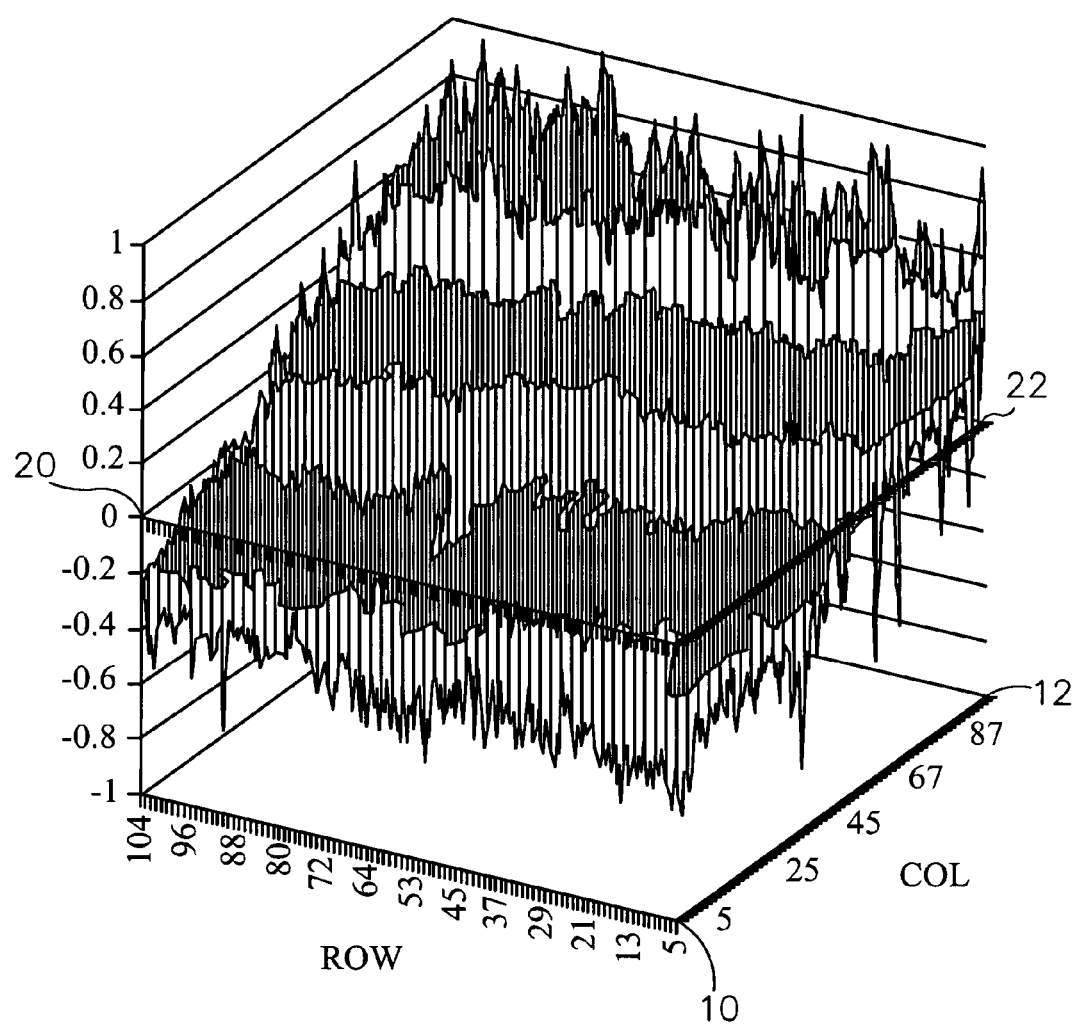
FIG. 1 is a graphical representation illustrating gradient effects imposed upon biological signal readings from a microarray, due to manufacturing imperfections in the production process.

Before the present methods, systems and computer readable media are described, it is to be understood that this invention is not limited to particular examples or embodiments described, as such may, of course, vary. It is also to be understood that the terminology used herein is for the purpose of describing particular embodiments only, and is not intended to be limiting, since the scope of the present invention will be limited only by the appended claims.

Where a range of values is provided, it is understood that each intervening value, to the tenth of the unit of the lower limit unless the context clearly dictates otherwise, between the upper and lower limits of that range is also specifically disclosed. Each smaller range between any stated value or intervening value in a stated range and any other stated or intervening value in that stated range is encompassed within the invention. The upper and lower limits of these smaller ranges may independently be included or excluded in the range, and each range where either, neither or both limits are included in the smaller ranges is also encompassed within the invention, subject to any specifically excluded limit in the stated range. Where the stated range includes one or both of the limits, ranges excluding either or both of those included limits are also included in the invention.

Unless defined otherwise, all technical and scientific terms used herein have the same meaning as commonly understood by one of ordinary skill in the art to which this invention belongs. Although any methods and materials similar or equivalent to those described herein can be used in the practice or testing of the present invention, the preferred methods and materials are now described. All publications mentioned herein are incorporated herein by reference to disclose and describe the methods and/or materials in connection with which the publications are cited.

It must be noted that as used herein and in the appended claims, the singular forms "a", "and", and "the" include plural referents unless the context clearly dictates otherwise. Thus, for example, reference to "a probe" includes a plurality of such probes and reference to "the variable" includes reference to one or more variables and equivalents thereof known to those skilled in the art, and so forth.

The publications discussed herein are provided solely for their disclosure prior to the filing date of the present application. Nothing herein is to be construed as an admission that the present invention is not entitled to antedate such publication by virtue of prior invention. Further, the dates of publication provided may be different from the actual publication dates which may need to be independently confirmed.

Definitions

A "nominal variable" is a variable the levels of which are just names to distinguish that to which they are assigned. Nominal variables cannot be ordered or scaled. For example, writers used in manufacturing microarrays can be tracked using nominal variables (e.g., "writer 1, writer 2, writer 3, etc." or "1, 2, 3, etc.") where the nominal variables assigned do not relate to any order or position of the writers.

An "ordinal variable" is similar to a nominal variable, but additionally, the variable assigned have order, although they cannot be scaled. For example, in a race, runners can be assigned ordinal variables as to the positions that they finish the race in. Thus, the variables "runner 1, runner 2, runner 3, etc" have meaning not only to identify the runners to which they were assigned, but also designate the places that the runners finished in, respectively. However, scaling of these variables is not possible. For example, there is no way to tell, from these variables, how close runner 2 finished to runner 1 in comparison with how close runner 2 finished to runner 3, etc.

A "scaled variable" is one in which levels are based on a number system, such that ordering and scaling of the levels are possible. Interpolation between scaled variables is possible, e.g., it is possible to interpolate between two adjacent time variables (which are an example of scaled variables) such that an interpolated value of forty-five seconds can be computed from adjacent values of forty seconds and fifty seconds.

A "chemical array", "microarray", "bioarray" or "array", unless a contrary intention appears, includes any one-, two- or three-dimensional arrangement of addressable regions bearing a particular chemical moiety or moieties associated with that region. A microarray is "addressable" in that it has multiple regions of moieties such that a region at a particular predetermined location on the microarray will detect a particular target or class of targets (although a feature may incidentally detect non-targets of that feature). Array features are typically, but need not be, separated by intervening spaces. In the case of an array, the "target" will be referenced as a moiety in a mobile phase, to be detected by probes, which are bound to the substrate at the various regions. However, either of the "target" or "target probes" may be the one, which is to be evaluated by the other.

Target molecules may be labeled with either a first chromophore that emits light at a first wavelength, or a second chromophore that emits light at a second wavelength and contacted to probes on the array. Following hybridization, the microarray can be read at the first wavelength to detect target molecules, labeled with the first chromophore, hybridized to features of the microarray, and can then be read at the second wavelength to detect target molecules, labeled with the second chromophore, hybridized to the features of the microarray. In one common microarray system, the first chromophore emits light at a near infrared wavelength, and the second chromophore emits light at a yellow visible-light wavelength, although these two chromophores, and corresponding signals, are referred to as "red" and "green." The data set obtained from reading the microarray at the red wavelength (i.e., using the "red channel") is referred to as the "red signal," and the data set obtained from reading the microarray at the green wavelength (i.e., using the "green channel") is referred to as the "green signal."

Methods to fabricate arrays are described in detail in U.S. Pat. Nos. 6,242,266; 6,232,072; 6,180,351; 6,171,797 and 6,323,043. As already mentioned, these references are incorporated herein by reference. Other drop deposition methods can be used for fabrication, as previously described herein. Also, instead of drop deposition methods, photolithographic array fabrication methods may be used. Interfeature areas need not be present particularly when the arrays are made by photolithographic methods as described in those patents.

Following receipt by a user, an array will typically be exposed to a sample and then read. Reading of an array may be accomplished by illuminating the array and reading the location and intensity of resulting fluorescence at multiple regions on each feature of the array. For example, a scanner may be used for this purpose is the AGILENT MICROARRAY SCANNER manufactured by Agilent Technologies, Palo, Alto, Calif. or other similar scanner. Other suitable apparatus and methods are described in U.S. Pat. Nos. 6,518,556; 6,486,457; 6,406,849; 6,371,370; 6,355,921; 6,320,196; 6,251,685 and 6,222,664. However, arrays may be read by any other methods or apparatus than the foregoing, other reading methods including other optical techniques (where each feature is provided with an electrode to detect bonding at that feature in a manner disclosed in U.S. Pat. Nos. 6,251,685, 6,221,583 and elsewhere).

When one item is indicated as being "remote" from another, this is referenced that the two items are in different physical locations, e.g., in different buildings, and may be at least one mile, ten miles, or at least one hundred miles apart.

"Communicating" information references transmitting the data representing that information as electrical signals over a suitable communication channel (for example, a private or public network).

"Forwarding" an item refers to any means of getting that item from one location to the next, whether by physically transporting that item or otherwise (where that is possible) and includes, at least in the case of data, physically transporting a medium carrying the data or communicating the data.

A "processor" references any hardware and/or software combination which will perform the functions required of it. For example, any processor herein may be a programmable digital microprocessor such as available in the form of a mainframe, server, or personal computer. Where the processor is programmable, suitable programming can be communicated from a remote location to the processor, or previously saved in a computer program product. For example, a magnetic or optical disk may carry the programming, and can be read by a suitable disk reader communicating with each processor at its corresponding station.

Reference to a singular item, includes the possibility that there are plural of the same items present.

"May" means optionally.

Methods recited herein may be carried out in any order of the recited events which is logically possible, as well as the recited order of events.

All patents and other references cited in this application, are incorporated into this application by reference except insofar as they may conflict with those of the present application (in which case the present application prevails).

One approach using analysis of variables, where the variables are nominal variables, assigns a value to each level, typically as a one in a data column for a level representing the presence of that particular condition that the variable is describing, or a zero for absence of that condition. An example of such an analysis may include the following nominal variables: machine used, operator of the machine, wafer, array, barcode, sample, etc., i.e., entities to which nominal labels can be applied. In this example, various combinations of the entities represented by the nominal variables can be used in preparing various samples, such as DNA samples, for example. An analysis of variance endeavors to determine how much each of the variables being considered contributes to variability in results. Thus, in this example, a researcher is interested in how much the particular machine used contributes to variability in results, how much the barcode used contributes to variability, how much the array contributes to variability, how much the operator contributes to variability, etc. The approach generates a total sum of squares from all of the data representative of the nominal variables and that represents the total variability in the data. Then the total sum of squares is partitioned to represent contributions from each of the nominal variables considered, to reflect the relative amount that each variable contributes to variability. Inherent to this approach is the assumption that the variables adequately represent and cover the space of the application. Otherwise, if the variables do not adequately represent or cover the space of the application (e.g., such as in the case of a random sample), then complex methods such as variance components for inference to the complete space of the functional application must be applied.

When scaled variables are considered along with the nominal/ordinal variables, the rows and columns of data representative of the scaled variables are dense, making calculations to find sum of squares very technically challenging, so that an inordinate amount of computer time is required when a problem can be solved at all. Examples of scaled variables include signal intensity levels across an array, temperatures at which array assays are processed, pressures, etc. A continuous functional relationship can be developed from the scaled variable data and the function can be used to calculate sum of squares values, that can be combined with the sum of square values calculated for the nominal variables to give a total sum of squares. Further details regarding developing continuous functional relationships are described in co-pending commonly owned application Ser. No. 10/422,570 field on Apr. 23, 2003 and titled "Microarray Performance Management System", incorporated by reference above.

A problem with solving large variable models of interrelationships such as those analyzed by analysis of variables approaches, complex biological array (CBA) metrics, scaled metrics or the like when analyzing scaled variables along with large numbers of nominal variables as described is the unwieldy amount of calculations that need to be performed when dense data columns and rows are considered along with larger numbers of sparse data columns and/or rows, as described above.

A statistical model that may be used to analyze such problems having a large number of factor variables is $$XB=Y \tag{1}$$

where

X is a matrix containing rows and columns of data representing the effects or factors by nominal and/or ordinal and/or scaled variables;

Y is a vector or matrix with a column for every actual dependent variable of readings of what is being measured (such as intensity plus noise, for example); and B is the solution matrix or vector containing a column for each response column in Y, that defines the effects of the independent variables (nominal and/or ordinal and/or scalar) on the outcome (e.g., intensity values).

application Ser. No. 10/422,570 and application Ser. No. 11/026,484, both incorporated by reference above, both disclose methods for calculating sums of squares to allocate relative amounts of influence or effect that each variable has on the outputs of an array.

Thus for a study of intensity, for example, a model can include all of the factors that may effect variability in intensity, as well as noise factors (useful in determining a measure of reliability of the intensity readings), such as, for example, manufacturing factors (wafer factors, synthesis (writer) factors, slides, positions of slides on wafers, and many other variables) hybridization factors, including many nominal variables as well as scaled variables. Simple flagging can generally indicate the levels for nominal variables, e.g., either writer one is being used (assign a value of 1) or it is not (assign a value of zero). This results in a high dimensional space but very sparse data. For example, if there are one hundred different process conditions that are to be considered with a batch of microarrays to study variability or quality and the effects on the same from each of the factors considered, then for each microarray process condition 1, each row or column of the overall matrix X that reflects the condition state 1 will have a one in the cell reflecting condition 1 and a zero in the ninety-nine other cells reflecting the other conditions, or other equivalent representations. A similar situation exists with regard to use of each of the other ninety-nine conditions, except for one for purposes of avoiding singularity results in calculations as further described below. For example, a column in which all cells are populated with "one" values may be provided, whose B parameters effectively represent the center of each response column as optimized by least squares regression.

This column full of one values is sometimes referred to as the "intercept column". For an example with five writers (e.g., inkjet printers used to synthesize arrays in situ on array substrates), one writer (e.g., writer no. 5) can be used to help define these response centers, while the other four writers are represented as shifts from the center of each Y-response. Hence, a vast portion of matrix X that reflects the nominal variables is very sparse indeed. Further, because there is no way to interpolate between nominal variables (e.g., it does not make sense to refer to writer 1.5, since there is no writer that exists between writer 1 and writer 2) a continuous function cannot be developed to describe such variables.

A pure ANOVA model, i.e., a model having only nominal variables can be run very quickly on a typical computer used in a bioresearch lab or in the office of a bioresearcher, based on least squares regression, using techniques for reducing the size of the X matrix when it is very large due to a large number of nominal variables, since the data will be very sparse in that matrix (e.g., regression matrix may be able to be blocked, diagonalized, or otherwise reduced based upon a pattern formed by the sparse data).

Scaled continuous variables (e.g., gradients across arrays, temperature, actual row and column positions on arrays, etc.) on the other hand, are inherently orderable, scalable and continuous and thus can be interpolated, such that continuous functions can be developed to describe scaled variables and so that values can be interpolated between the known or given values for such a variable. Likewise, a model containing only scaled variables can typically be readily processed on a standard computer such as found in a bioresearch lab or a researcher's office, based on least squares regression. Although such a model works with a matrix having densely populated row and column data, and thus does not show any easily reducible patterns, there are typically nowhere near as many rows and columns in a scaled variable model as there are in a nominal variable model. Given the practical range of number of columns of scaled variables that are typically presented for processing, such a model is typically relatively fast and easy to process.

Problems arise when a model contains large numbers of nominal variables 110 and also some scaled and/or ordinal variables 120 as schematically represented in the matrix 100 of FIG. 2. For example, it was not possible, within a practical amount of time to solve a problem including four arrays with 1,400 probes each with five columns of gradient measurements (scaled vectors) an intercept term column (scaled vector) and five other columns representing scaled vectors. In such a situation, the regression matrix 100 no longer has a simple pattern as it would if only large numbers of nominal variables were being considered, since a portion of the matrix contains the dense data resultant from the scaled (and/or ordinal) variables that does not have a simple pattern. Thus, the combination of these columns eliminates the ability to reduce the sparsely populated data under columns 110, so that enormous numbers of calculations must be carried out to process the model. Such matrices may be so large that they may not be able to be solved by the conventional approaches referred to above, even on computers that are more powerful than those that are typically found in a research laboratory or in a researcher's office. For example, such a model may have millions or billions of variables, i.e., n=millions or billions. The least squares solution is an $n^2$ problem to solve and $n^2$ becomes very unwieldy in such an example, since the least squared terms in B are given by:

$$B = (X'X)^{-1} X'Y \qquad (2)$$

and the sum of squares of errors are given by:

$$SQE = Y'[I - X(X'X)^{-1}X']Y \qquad (3)$$

where
SQE designates sum of squares of errors, and
I designates the identity matrix.

The component $(X'X)^{-1} X'$ is a projection operator that functions to project the data from a data vector manifold space down to the model parameter manifold, for a model that is being used to model the data. The projection of the data onto the plane of the model (the manifold) indicates what portion of the data that the model can cover or describe. The portion(s) of the data that the model can't fit are called residuals or errors (residual manifold space).

When the X matrix (matrix 100 in the example referred to in FIG. 2) is so enormous and does not exhibit a simple pattern, as when both large numbers of nominal/ordinal variables and some practical number of scaled variables are represented (i.e., wherein although the portion of the matrix representative of the nominal variables typically exhibits a simple, sparse pattern, the portion representative of the scaled/ordinal variables does not, and inverting such a matrix and multiplying as required in equation (2) above, eliminates the simple pattern in the result, then it is very computationally challenging to invert the matrix X as required by equation (2). Further, the calculation of X'X is computationally challenging and time consuming.

In order to make such a model manageable, an optimization of B may be performed in the over-determined statistical matrix system given by equation (1), into an iteration of smaller problems by solving equation (2) iteratively, as by using fast Fourier transforms (FFT), for example. The iterations may be performed with regard to partitioned columns of the very large matrix X (or, alternatively, partitioned rows when the number of rows is exceedingly large) to significantly reduce the magnitude of the number of calculations that must be performed to solve any one iteration. Thus matrix X is partitioned into q mutually exclusive, exhaustive bins of columns (or alternatively, rows), with each bin indexed by j, i.e., j=1,2, . . . ,q. The bins may be of arbitrary size (e.g., numbers of columns) with the caveat that viable/rational number sizes speed convergence to a solution. It is further noted that the bins can be of unequal sizes relative to each other. A current guideline used in selecting bins is to keep nominal/ordinal variables in bins separate from those containing scaled (continuous) variables, and vice versa. Although this is not a necessary condition, it does facilitate the use of sparse matrix methods for processing the bins containing the nominal/ordinal variable columns or rows.

For any matrix M, by defining $M_{,j}$ as the $j^{th}$ bin of columns, see FIG. 3, (or, alternatively, $M_{j,}$ as the $j^{th}$ bin of rows), and defining $M_{[j]}$ as M with the $j^{th}$ bin of columns deleted (or, alternatively, $M_{[j,]}$ as M with the $j^{th}$ bin of rows deleted), then to solve for B in equations (1)-(2), an estimate for B is used to carry out the first iteration, where $B_j^0$=estimate, for all bins $j=B^0$, note $B_j \approx B_j$. (see equations (4)-(9) below).

Figure 4:
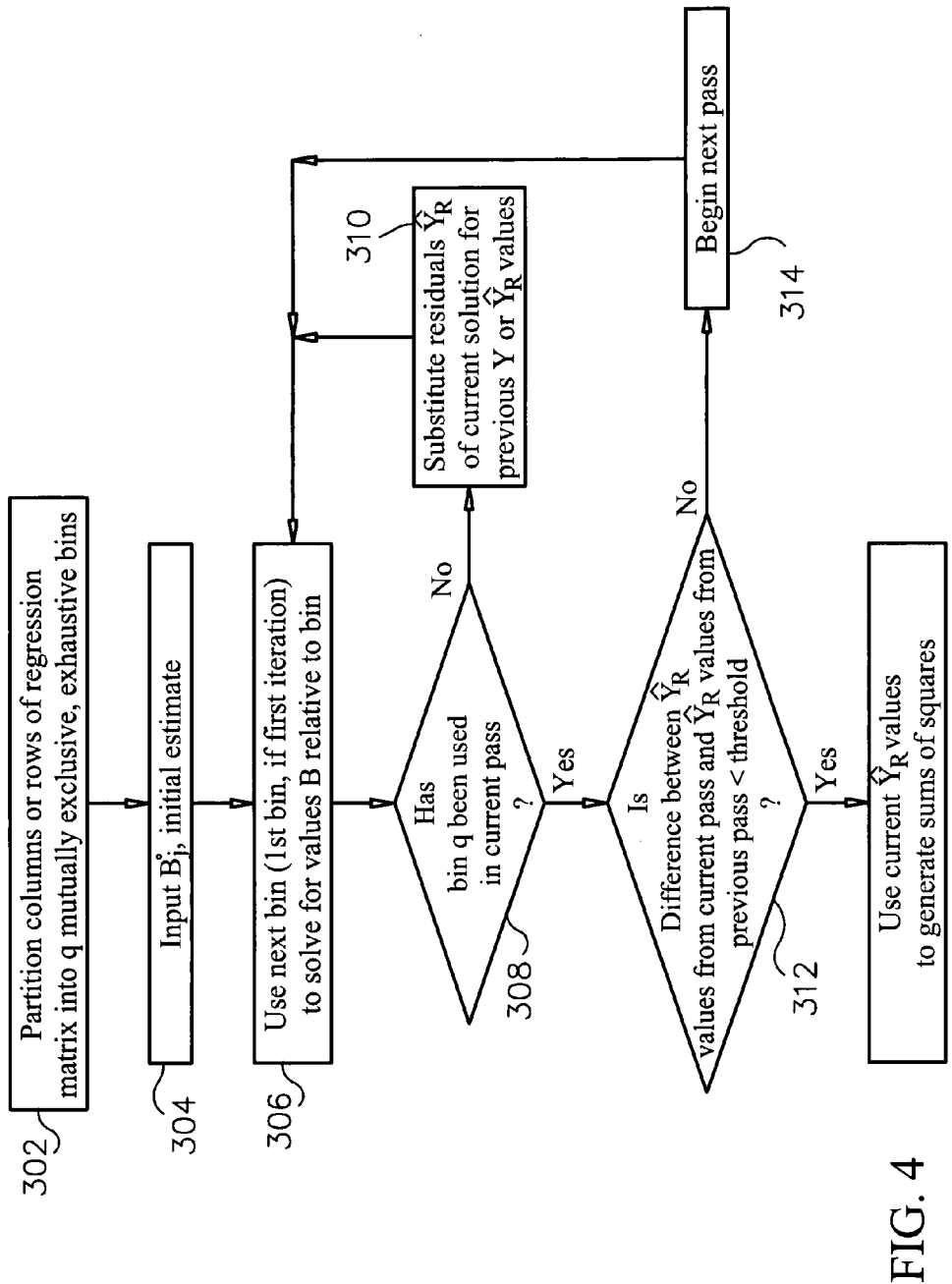
FIG. 4 is a flowchart illustrating events that may be carried out for fast analysis of variance.

For example, univariate initial estimates may be used for $B^0$ estimate and its associated $\hat{Y}_R$, where correlations among columns (or rows) of scaled variables and columns (or rows) of nominal/ordinal variables are ignored. After partitioning the column or rows of matrix X in a manner described (see FIG. 4, event 302) into mutually exclusive and exhaustive bins (i.e., wherein all columns are accounted for by the bins, and each column is included in only one of the bins), and using the initial estimate (see FIG. 4, event 304), the first bin (e.g., $X_1$ where the number of columns in the bin may be any number from 1 to n), equation (2) is then solved in terms of $X_1$ at event 306. Assuming that there is more than one bin, at event 308, it will be determined at this stage that not all q bins have been considered. In such case, the residuals $\hat{Y}_R$ from the solutions after solving using the current bin (e.g., first bin, in the current iteration being described) are then used to substitute for the measurements or "Y values" or previous residuals $\hat{Y}_R$, at event 310, wherein Y may be a vector or matrix 200 as shown in FIG. 3. Updating may be carried out immediately for a current bin, or updating may be delayed until all bins have been processed on a current pass (where a pass encompasses one iteration of processing the total number of bins), at which time all bins may be updated. The latter option requires multivariate update methods such as conjugate gradient, Marquardt-Levenberg procedures, or use of a low pass filter, such as a Holt-Winters low pass filter applied to the series of complete passes, for example. Using the former option (the simpler immediate bin/partition update method), after updating the current bin, the next bin is then used at event 306 to substitute for X in equation (2) to carry out the next iteration and new B values are calculated based upon the new bin and the current residual values $\hat{Y}_R$. With each iteration, the values for B that are calculated are considered to be the best solution from all previous solutions. That is, given the number of columns or rows that have been considered up to the time of that particular iteration, the values for B are the best solution to characterize Y. An iteration k+1, where k+1≦q is characterized according to the following:

$$X_j B_j^{k+1} = (Y - X_{[,j]} B_{[j,]}^k) \quad (4)$$

where $Y - X_{[,j]} B_{[j,]}^k$ is the residual of the values of Y after subtracting the best solution values from the previous iteration. Rearranging and solving for the least squares terms of the solution for the current iteration, based on the prior solution gives:

$$B_j^{k+1} = [X'_j X_j]^{-1} X'_j (Y - X_{[,j]} B_{[j,]}^k) \quad (5)$$

and $$B_j^{k+1} = [X'_j X_j]^{-1} X'_j (Y - XB^k + X_j B_j^k) \quad (6)$$

where $X'_j X_{[,j]} B_{[j,]}^k = X'_j (XB^k - X'_j (Y - XB^k))$.
Rearranging gives:

$$B_j^{k+1} - B_j^k = [X'_j X_j]^{-1} X'_j (Y - XB^k) \quad (7)$$

The difference between the estimated $k^{th}$ solution and the estimated solution for the $k+1^{st}$ iteration is:

$$(Y - XB^k)_j^{k+1} = Y - XB^k + X_j B_j^k - X_j B_j^{k+1} \quad (8)$$

or $$(Y - XB^k)_j^{k+1} = Y - XB^k - X_j \Delta_j^{k+1} \quad (9)$$

where $\Delta_j^{k+1} = B_j^{k+1} - B_j^k$.

The above approach is a generalization of the Jacobi and Gauss-Seidel algorithms and matrix-splitting concepts described in Golub and Van Loan (Matrix Computations, $2^{nd}$ edition, which is incorporated herein, in its entirety, by reference thereto) and applies to problems involving statistical analysis with blocks of columns/variables with different data properties, whereas the Jacobi and Gauss-Seidl algorithms apply only to square matrices, e.g., square matrix A (i.e., alias X) solving for "x" (Alias B), also known as a "saturated design", meaning that, if applied to a problem of the type described in this disclosure, the Jacobi and Gauss-Seidl algorithms are left with no degrees of freedom (manifold for errors) so that the statistical properties of such an approach are poor to non-existent.

B-updates may be performed sequentially for each bin or in parallel for all bins. Further, updates may be improved by conjugate gradient or Marquardt-Levenberg modifications. Conjugate gradient techniques consider second-order impacts on the optimization process. A more extensive discussion of conjugate gradient techniques can be found at http://mathworld.wolfram.com/Conjugate Gradient-Method.html. A copy of this document which was downloaded on Nov. 24, 2004 is being submitted as a disclosure document in this application, and is also hereby incorporated herein, in its entirety, by reference thereto.

The Marquardt-Levenberg method is described in more detail in co-pending commonly owned application Ser. No. 10/422,570 (which was already incorporated by reference above) and in co-pending, commonly owned application Ser. No. 10/400,372 filed Mar. 27, 2003 and titled "Method and System for Predicting Multi-Variable Outcomes". application Ser. No. 10/400,372 is hereby incorporated herein, in its entirety, by reference thereto. Further, application Ser. No. 10/400,372 claims the benefit of Provisional Application No. 60/368,586 and Provisional Application No. 60/368,586 is also hereby incorporated herein, in its entirety, by reference thereto.

After processing iterations of all bins in a first pass of the problem, it is determined that bin q has been processed for the current pass at event 308. At this time, it is considered at event 312 whether differences between the residuals (or B values) from the current pass and the residuals (or B values, respectively) from the previous pass are less than acceptable threshold values, where threshold values may be previously determined. Threshold values may be set by a person or persons of skill having numerical and practical expertise in the domain of the specific application to which the current methods are applied for analysis. At the stage currently described, there has been only one pass, so that there are no differences to calculate. Accordingly, a next pass is initiated at even 314 where iterations of all bins are processed according to events 306-310 beginning with the latest set of residual values from the previous pass. After all q bins have again been processed in the current pass, then it is considered again at event 312, whether the differences in the current residual values and residual values at the end of the previous pass are within the accepted tolerances. Iterations are typically carried out until the delta elements (i.e., "Δ"'s in equation (8)) become smaller in magnitude than an accepted and/or predetermined threshold magnitude, or alternatively, until a preset maximum number of iterations have been performed, as necessary to end a possible but improbable cycle convergence. Once the values are within tolerance, then the most current Y-residual values are used at event 316 to generate error sums of squares values for use in determining ANOVA/regression statistical significance according to least squares methodology as determined by the best values for B, which do the best job of fitting the Y columns based upon matrix X. While least squares regression is typically best for normal errors, e.g., Gaussian distributed errors, other known methodologies may alternatively be applied to solve for the best values for B, including known methodologies such as Min-Max Entropy, Maximum Entropy, or Maximum Likelihood.

Sparse methods may be used for sparse bins. For sparse bins, the processing described by the equations above may be designed to ignore zero values in all ordinal and nominal columns that are inherently sparse, i.e., that contain all zeros except for one value, or that contain greater than a predetermined number or percentage of zeros, an example of which is demonstrated in FIGS. 2 and 3. Typically, scaled columns are not sparse, as noted above. However, in the rare event that a scaled column does exist as inherently sparse, the sparse methods indicated above may also be applied to one or more such columns. The sparse methods use one column to capture non-zero entries from as many columns as possible in one column, so as to conserve computational efficiency.

For example, consider a nominal or ordinal variable that describes array writers, where there are five writers, which can be expressed by five levels of the variable. In this case, using sparse methods, one column captures all information for the writer variable, with "1", "2", "3", "4" or "5" used as labels to indicate the writer source. "1", "2", "3", "4" and "5" are not treated as numbers during the processing, but are expanded to five flagging columns (i.e., one per level) each with entries of "1" or "0" only. Note that typically these columns are transformed, but the sparsity is preserved. The present system solves the iteration equations over all bins without expanding the single column in the example above to the five sparse columns, thus saving large amounts of memory that would otherwise be used to store the additional columns with all the zeros. Also, by using the single column (or reduced number of columns when more than one sparse variable is being treated by sparse methods, for example) computational efficiency is vastly improved, greatly reducing the amount of time needed to calculate solutions, since an enormous number of zeroes (and columns) can be eliminated from computational processing. Hence the compressed column or columns map directly to the regression columns (i.e., non-compressed columns or columns of the X matrix) so there is no need to actually use the regression columns that require a very substantial amount of storage space (typically comprising at least about 40% zeroes) and require a lot of unnecessary computations, as described above. In the example immediately above, the values 1, 2, 3, 4 and 5 of each row in the compressed column may be expanded to multiple columns with values of 1000, 0100, 0010, 0001, and -1-1-1-1. Thus a sparse bin that may be compressed according to the sparse methods described will typically comprise at least about 40% zeroes.

Ridge-conditioning may be applied to correct for rank-deficiency properties of X. X-columns (or rows, as the case may be) are not independent. For example, there may be linear or near-linear relations among X-columns. Ridge-conditioning inserts an artificial row to effectively correct to full rank, a rank deficient X to enable calculation of a rank-deficient solution with only a small bias resulting from such technique. Hence ridge-conditioning may provide a Least Squares solution in this situation unless the solution is singular, as in the case of nominal variables. Nominal columns are inherently interdependent, but may be transformed into sparse independent columns. One example of ridge-conditioning that may be applied is ridge regression or Tikhonov regularization, the details of which are described in "Ridge regression/Tikhonov regularization" at www.gps.caltech.edu/~tapio/acm118/Handouts/ridge.pdf. A copy of this document which was downloaded on Nov. 24, 2004 is being submitted as a disclosure document in this application, and is also hereby incorporated herein, in its entirety, by reference thereto.

The Type IV sum of squares contributions from all the different variables in a matrix generated from values assigned to variables, as described, whether that matrix is a pure ANOVA model (nominal variables only), contains only scaled and/or ordinal variables, contains primarily scaled and/or ordinal variables with a minority of nominal variables, or is a composite matrix of nominal with scaled and/or ordinal variables with many sparse columns, may be determined as described, and then such sum of squares and its mean sum of squares or square root thereof (e.g., root mean square (RMS)) may be used to generate metrics to measure characteristics of chemical arrays. Specific contributions/effects on the process of making a chemical array, as wells as the product (chemical array) outputted by the process can be analyzed based on the results of the ANOVA computations, e.g., sums of squares terms and related output (e.g., RMS). Additionally, these results can be used to create metrics to further characterize the chemical arrays produced. For example, the results (terms) may be inputted to a control chart, and sets of these terms may be accumulated over time. Analysis of the time series of terms may then be performed to see how various contributions/characteristics change over time from which conclusions may be drawn as to degradation of the performance of a variable (pen shift, hybridization problems, etc.), and as to quality and consistency of the end products (chemical arrays). Alternatively, one or more factors (variables) in the process may be changed over the course of generating the control chart, and subsequent analysis and comparison of the terms in the control chart may be performed to determine effects, if any that the change in variable(s) had on the resulting chemical arrays. By using such mathematical quantities (terms) having sound statistical properties, metrics developed are statistically significant without the need for further validation.

Figure 5:
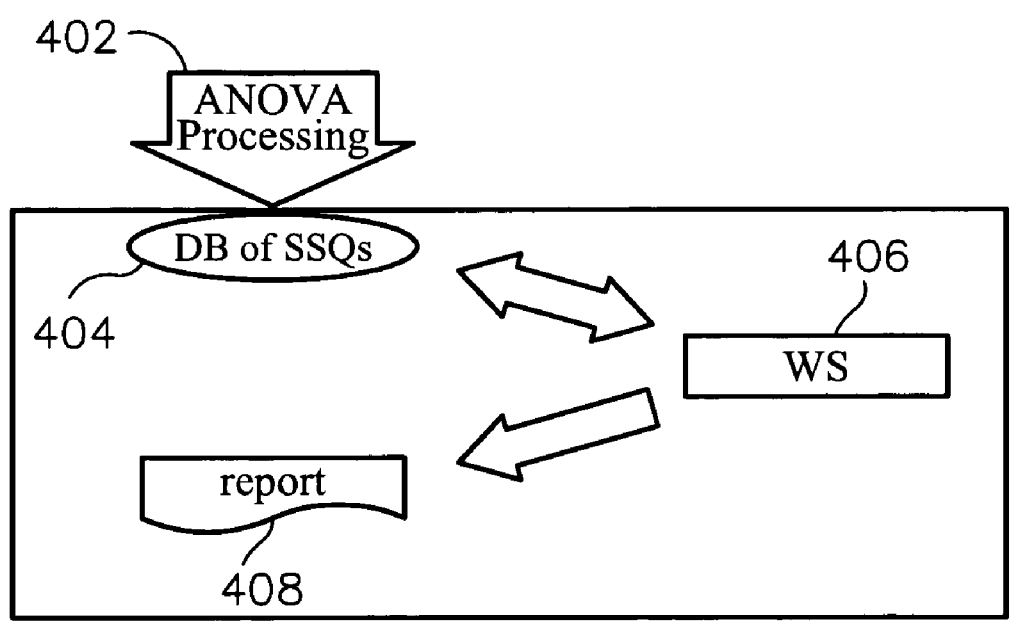
FIG. 5 is a block diagram illustrating a system useful for calculating metrics according to the present invention.

Sums of squares terms generated by ANOVA processing 402 by the system may be stored in a database 404 along with degrees of freedom characterizing the variables considered for the calculations, which data may be accessed by a user through workstation 406, for example, as illustrated in FIG. 5. Characteristics may be compared within a chemical array (intra-array) as well as between chemical arrays (inter-array, as long as there is not significant error correlation between the arrays). For example, a user may access database 404 via workstation/user interface 406 with an inquiry as to how the quality of one or more chemical arrays currently produced compares with that of one or more chemical arrays produced by the same process at an earlier time, e.g., a year ago. Multiple sets of data, obtained for the same samples and same sums of squares terms, may thus be plotted on a run chart against the times that each different array, from which the sets of data were obtained, were processed.

Metrics as described herein may be computed for intra-array characterization of quality control arrays, which are arrays specifically designed with replicates of particular probes used in measuring quality characteristics of array manufacturing processes, as well as customer arrays, that may not include all of the quality control probes that an array would ordinarily include, but may contain "embedded quality control features" which may defined by be a smaller number of control probes than the ordinary number, but wherein the control probes that are included are replicated (e.g., a set of about one hundred probes each having at least about five, typically about ten replicates) placed on arrays that are otherwise hybridized with experimental samples. For inter-array analysis, replicates are not always necessary.

Metrics may be generated by performing an F-test between sums of squares values to determine whether the values statistically significantly differ from one another, as determined by the p-value of the result. The sums of squares values are defined by the corresponding degrees of freedom values associated therewith in forming the F-statistic, according to the following:

$$F\text{-}stat=(SSQ1/df1)/(SSQ2/df2) \qquad (10)$$

where the p-value of the F-stat equals the probability of an unusual F-statistic, i.e., that a significant differential ratio exists between the two sums of squares values. Thus, statistically valid metrics may be generated from sums of squares values and their associated degrees of freedom data, having been calculated to characterize individual chemical arrays and stored in database 404. Sums of squares data in database 404 may be used to establish baseline values and to calculate metrics in response to general queries from users via workstation 406 or other user interface. Any ANOVA (nominal) or covariate (scaled, ordinal) variables/terms may be compared as described, based upon the previously calculated sums of squares terms describing the impact of such variables and the associated degrees of freedom values.

Figure 6:
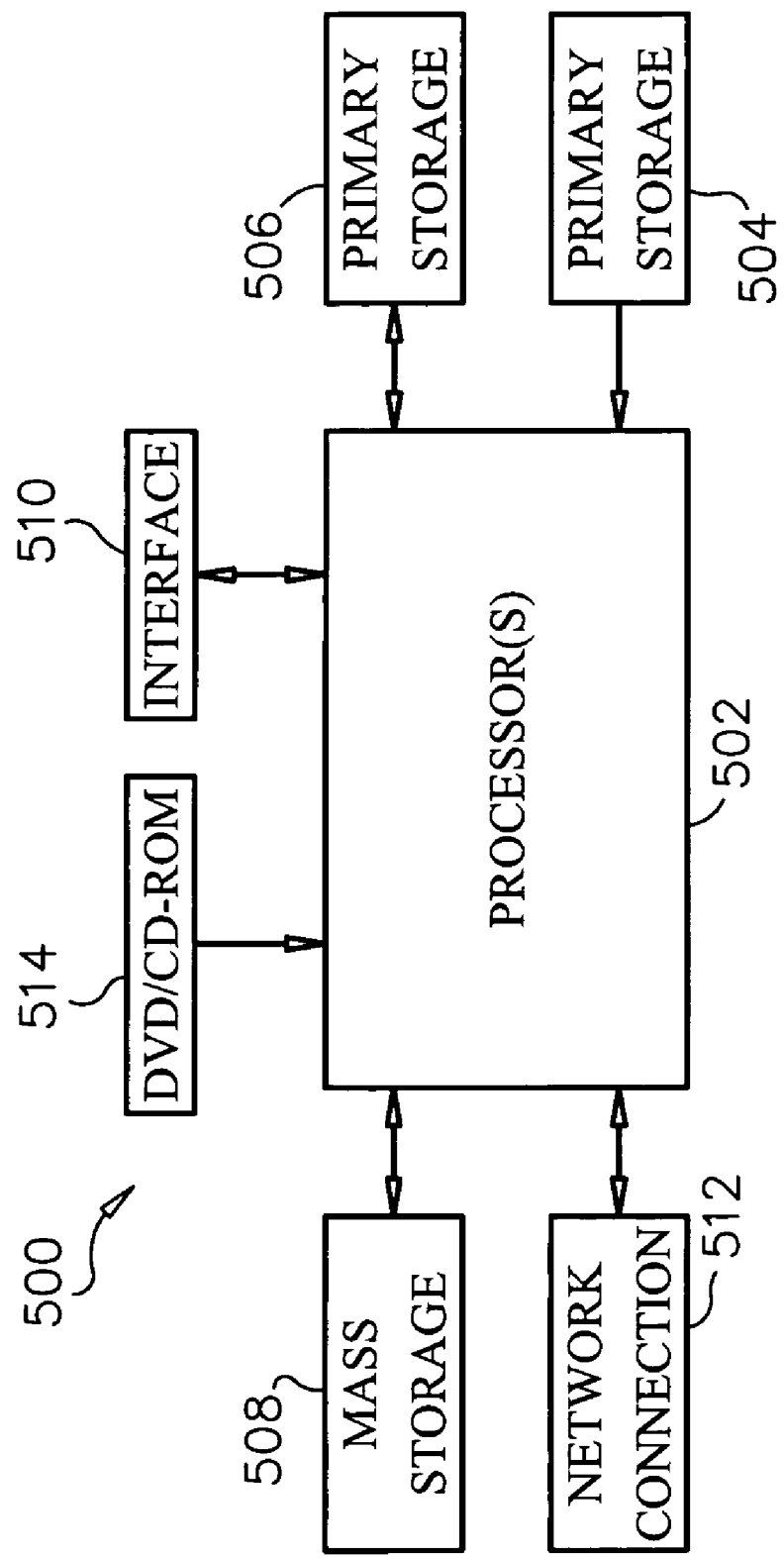
FIG. 6 illustrates a typical computer system that may be employed in a system as in accordance with an embodiment of the present invention, and/or to carry out a method or instructions on computer readable media according to the present invention.

FIG. 6 illustrates a typical computer system in accordance with an embodiment of the present invention. The computer system 500 includes any number of processors 502 (also referred to as central processing units, or CPUs) that are coupled to storage devices including primary storage 506 (typically a random access memory, or RAM), primary storage 504 (typically a read only memory, or ROM). As is well known in the art, primary storage 504 acts to transfer data and instructions uni-directionally to the CPU and primary storage 506 is used typically to transfer data and instructions in a bi-directional manner Both of these primary storage devices may include any suitable computer-readable media such as those described above. A mass storage device 508 is also coupled bi-directionally to CPU 502 and provides additional data storage capacity and may include any of the computer-readable media described above. Mass storage device 508 may be used to store programs, data and the like and is typically a secondary storage medium such as a hard disk that is slower than primary storage. It will be appreciated that the information retained within the mass storage device 508, may, in appropriate cases, be incorporated in standard fashion as part of primary storage 506 as virtual memory. A specific mass storage device such as a CD-ROM or DVD-ROM 514 may also pass data uni-directionally to the CPU. Alternatively, device 514 may be connected for bi-directional data transfer, such as in the case of a CD-RW or DVD-RW, for example.

CPU 502 is also coupled to an interface 510 that may include one or more input/output devices such as video monitors, track balls, mice, keyboards, microphones, touch-sensitive displays, transducer card readers, magnetic or paper tape readers, tablets, styluses, voice or handwriting recognizers, or other well-known input devices such as, of course, other computers. Finally, CPU 502 optionally may be coupled to a computer or telecommunications network using a network connection as shown generally at 512. With such a network connection, it is contemplated that the CPU might receive information from the network, or might output information to the network in the course of performing the above-described method steps. The above-described devices and materials will be familiar to those of skill in the computer hardware and software arts.

The hardware elements described above may implement the instructions of multiple software modules for performing the operations of this invention. For example, instructions for calculating sums of square terms and or for calculating metrics may be stored on mass storage device 508 or 514 and executed on CPU 508 in conjunction with primary memory 506.

In addition, embodiments of the present invention further relate to computer readable media or computer program products that include program instructions and/or data (including data structures) for performing various computer-implemented operations. The media and program instructions may be those specially designed and constructed for the purposes of the present invention, or they may be of the kind well known and available to those having skill in the computer software arts. Examples of computer-readable media include, but are not limited to, magnetic media such as hard disks, floppy disks, and magnetic tape; optical media such as CD-ROM, CDRW, DVD-ROM, or DVD-RW disks; magneto-optical media such as floptical disks; and hardware devices that are specially configured to store and perform program instructions, such as read-only memory devices (ROM) and random access memory (RAM). Examples of program instructions include both machine code, such as produced by a compiler, and files containing higher level code that may be executed by the computer using an interpreter.

EXAMPLES

The following examples are put forth so as to provide those of ordinary skill in the art with a complete disclosure and description of how to make and use the present invention, and are not intended to limit the scope of what the inventor regards as his invention nor are they intended to represent that the experiments below are all or the only experiments performed. Efforts have been made to ensure accuracy with respect to numbers used (e.g. amounts, temperature, etc.) but some experimental errors and deviations should be accounted for.

Example 1

Probe Uniformity and Sensitivity, Single Array

For a single array considered (i.e., intra-array analysis) it was desired to determine how uniform the signal was for a specific probe at different locations (i.e., replicates of the same probe at different locations on the array), and for different probes how much signal dynamic range and magnitude was achieved relative to inherent non-uniformity.

As input, a single color (in this case, the green channel) from a specific set of replicate probes (i.e., oversampled probes) was used. A role property was assigned to each variable or factor, wherein role property C represented a continuous variable (i.e., covariate or scalar variable), role property N represented a nominal variable (also referred to as a blocking term) and role property O represented an ordinal variable.

"FE names" referred to columns that contained actual signal data (i.e., Ln(gDyeNormSignal)) and were assigned role property C.

The probe names that identified the specific probes that the calculations were based on (i.e., ProbeName) were assigned role property N.

The X- and Y-axis positions of the probes (i.e., PositionX and PositionY) were each assigned the role property C.

Standard regression ANOVA analysis was performed (as provided by JMP*SAS) of Ln(gDyeNormSignal) regressed on OSProbeName (OSProbeName signifies over-sampled probes, i.e., replicated probes on the same array) and ResponseSurface(PositionX,PostionY)=RS(PositionX,PostionY), which is a multivariate second-order polynomial characterizing probe properties which may include, but are not limited to: location, target depletion factor (which is a measure of array probe density of a given sequence, wherein density is proportional to target depletion; target depletion factor is commonly referred to in association with quality control arrays), depurination loading (e.g., the product probability that all nucleic acid residues "A" in a sequence are undamaged/intact), sequence composition, etc., to calculate the following outputs: Type IV error ssqs (error sum of squares), error dfs (error degrees of freedom) for factors such as: ProbeName ssqs (ProbeName sum of squares) and ProbeName dfs (ProbeName degrees of freedom). Factor error ssqs is the sum of squares value left over after taking out all of the sums of squares values contributed by all but one of the known variables, from the total sum of squares. DFS error is equal to the total number of data points minus DFS of included factors. If all factors are removed, then the error sum of squares is due to unknown factors whose ensemble contribution tends to be like random noise contributing to replicate error. The difference between this random ssqs value and the factor error ssqs value is the Type IV ssqs value for that factor. For example, ProbeName ssqs (performed with regard to ten replicates each of one hundred probes in this example) were calculated in a model that included a surface gradient function such as RS(x,y) (response surface) with its related ANOVA metric RMS of surface to measure the dynamic range of the average values of the replicates for the probes considered.

Relatively speaking, the greater the dynamic range for an array, the better the performance of that array as compared to the same array design that exhibits a relatively lower dynamic range, and the greater that the ProbeName ssqs value is, the greater is the dynamic range of the array being characterized. ProbeName dfs is the number of oversampled probes minus one.

Based on the ANOVA analysis performed and the following formula:

$$Ln(DyeNormSignal_{jk})=C+OSProbe_j+RS(x,y)_{jk}+uniformity\ error_{jk},$$

j=1 to 100, k=1 to 10, the following results were obtained:

| effect | DF | Sum of Squares | metric |
| --- | --- | --- | --- |
| c | 1 | 46.1482116 | Magnitude+ |
| ProbeName | 99 | 1143.9754 | Dynamic range+ |
| total signal | 100 | 1190.123612 | Sensitivity+ |
| PositionX&RS | 1 | 13.0132 | X-slope− |
| PositionY&RS | 1 | 8.0782 | Y-slope− |
| PositionX*PositionX | 1 | 0.4025 | X-curvature− |
| PositionY*PositionX | 1 | 1.9652 | YX-saddle− |
| PositionY*PositionY | 1 | 0.1512 | Y-curvature− |
| RS | 5 | 23.6103 | gradient metric− |
| Error | 895 | 25.7923 | Uniformity− | where c represented the ubiquitous intercept term, and RS characterized the response surface. It is noted that total DFS=1000, hence, the total signal+RS+error=1000 DFS. The error resultant after subtracting the sums of squares of the above effects from the total sum of squares provides a measure of uniformity. That is by taking out the effects of gradient (i.e., response surface effect) and the effects of different probe sequences (ProbeName), the resultant Error effect provides a metric that describes the uniformity of the array. Thus, for the impossible ideal of perfect uniformity, where all probe signals are equal and no random error exists, the sum of square value of Error would be zero.

Total signal combines magnitude and dynamic range to give sensitivity. However, the sum of squares from the above results cannot simply be added, but must be calculated by removing the terms to see the resultant error sum of squares and comparing that resultant squares with the above error sum of squares. The difference is the combined effect of those two terms and gives the resultant sum of squares value for sensitivity.

From the above results, an F-test (i.e., F-statistic) of effect versus error can be calculated to provide within-array (intra-array) significance (p-value).

Additionally, by similar ANOVA analysis of another array, an F-test of an effect from the above array versus the same effect in said another array can be calculated to provide between-array (inter-array) significance (p-value).

Example 2

Probe Reproducibility Across Different Arrays, Multiple Arrays

This example considered multiple arrays to determine reproducibility of results from the same probes across different arrays, in response to a query as to how uniform is the ratio of signals received on two channels from a specific probe across arrays (e.g., does the lnratio value calculated from signals received from two channels from a particular probe vary from array to array?).

As input, oversampled (i.e., where replicate of each "oversampled" probe are provided at various different locations on the array) probes from a packet of eight arrays were selected. Role properties were assigned according to the three levels: C, N, O as defined in Example 1.

As in Example 1, the variable "FE names" was assigned as C. FE names in this case are defined by Ln(rDyeNormSignal/gDyeNormSignal). The barcode (i.e., unique identifier that distinguished one array from another) was assigned as N (nominal variable), and ProbeName was assigned as N.

Since multiple arrays were considered in this example, some of which were dye-flipped, RedGreenTarget labeled each experimental condition, where RedSample+GreenSample was renamed RedGreenTarget and assigned as N (nominal variable).

The output in this example was Barcode[RedGreenTarget,ProbeName] ssqs, and Barcode[RedGreenTarget,ProbeName] dfs, where u[v,w] means u nested in v nested in w, i.e., the results of an interaction between u and the results of an interaction between v and w. Thus, for example, Barcode[RedGreenTarget,ProbeName] represents the results of a nested interaction between Barcode and the results of an interaction between RedGreenTarget and ProbeName, i.e., the barcode effect depends upon a combination of the ProbeName and dye channel factors.

Standard regression ANOVA analysis was performed (as provided by JMP*SAS) of Ln(rDyeNormSignal/gDyeNormSignal) regressed on RedGreenTarget, ProbeName [RedGreenTarget], and Barcode [RedGreenTarget,ProbeName].

Based on the ANOVA analysis performed, and the following formula:

$$Ln(rDyeNormSignal/gDyeNormSignal)_{ijkm}=c+Target_m+Probe_j[Target_m]+array_i[Probe_j,Target_m]+error_{ijkm},$$

i=1 to 2, j=1 to 100, k=1 to 10, m=1 to 4, where four of the eight arrays were self-self arrays and four of the arrays were dye flip arrays (accounted for by the indices "i" and "m" in the above formula), the following results were obtained:

| effect | DF | Sum of Squares | metric |
|---|---|---|---|
| RedGreenTarget | 3 | 33.4028 | |
| ProbeName [RedGreenTarget] | 396 | 3385.6479 | |
| Barcode [RedGreenTarget,ProbeName] | 400 | 8.8573 | Reproducibility– |
| Error | 7198 | 413.4751 | group uniformity– |

The error resultant after removing the effects from the differences in target and probe name as well as the difference in array (Barcode) provides a measure of group uniformity or reproducibility of probe signal across different arrays.

Similar to what was noted above with regard to Example 1, an F-test of an effect versus error may be computed to provide a significance value (p-value) for the group. An F-test of an effect versus same effect in another array group produces significance between the two groups.

Example 3

Signature Correlation, Multiple Arrays

This example provides a measure of similarity of ratio trends (e.g., the log differential expression ratios between two samples for each probe) across probes on different arrays, such as, for example, to determine whether barcode (i.e., a specific array that a probe is located on) impacts probe-ratio trends.

Oversampled probes from a packet of eight arrays were selected as input for this example, and role properties were assigned from the three levels: C, N, O (defined in previous examples). FE names, defined as Ln(rDyeNormSignal/gDyeNormSignal) was assigned as a continuous variable, C. Barcode was assigned as an N variable, as was ProbeName. RedGreenTarget was again defined as RedSample+GreenSample and assigned as a nominal variable N.

The output in this example was Barcode[RedGreenTarget, ProbeName] ssqs and Barcode[RedGreenTarget,ProbeName] dfs, wherein the same nesting annotation as described in Example 2 was used.

Standard regression ANOVA analysis was performed (e.g., as provided by JMP*SAS) of Ln(rDyeNormSignal/gDyeNormSignal) regressed on RedGreenTarget, ProbeName[RedGreenTarget], Barcode[RedGreenTarget], and Barcode*ProbeName[RedGreenTarget].

Based on the ANOVA analysis performed, and the following formula:

$$\text{Ln}(r\text{DyeNormSignal}/g\text{DyeNormSignal})_{ijkm} = c + \text{Target}_m + \text{Probe}_j[\text{Target}_m] + \text{array}_i[\text{Target}_m] + \text{array}_i * \text{Probe}_j[\text{Target}_m] + \text{error}_{ijkm},$$

i=1 to 2, j=1 to 100, k=1 to 10, m=1 to 2, where four of the arrays were self-self arrays (i.e., same target on the probes to be read by both channels of a scanner (e.g., red and green channels), for each probe); and four of the arrays were dye flip arrays (i.e., red target for a probe (e.g., target to be read on a first channel of a scanner) on one array is "flipped" to a green target (e.g., target to be read on a second channel of the scanner), and vice versa) as accounted for by the indices "i" and "m" in the above formula, the following results were obtained:

| effect | DF | Sum of Squares | metric |
|---|---|---|---|
| RedGreenTarget | 1 | 32.8598 | |
| ProbeName[RedGreenTarget] | 198 | 3329.6427 | |
| Barcode[RedGreenTarget] | 2 | 0.0355 | |
| Barcode*ProbeName [RedGreenTarget] | 198 | 4.5743 | signature correlation– |
| Error | 3598 | 187.9363 | group uniformity pos– |

The general method measures any correlation in terms of an ANOVA factor. Hence, signature correlation is inversely related to ANOVA factor Barcode*ProbeName{RedGreenTarget]. The residual error is mainly replicate error that measures uniformity.

An F-test of an effect versus error may be calculated to produce a significance value for the group. An F-test of an effect versus the same effect in another array group may be calculated to produce a significance value between the two groups with respect to that effect.

Example 4

Probe False Positive Rate, Multiple Arrays

This example considered multiple arrays to determine a measure of dynamic range of lnratio signals that is detected in the arrays. If the same sample is in both channels of an array (designated by A/A), then ideally a log-log plot will show all points on the diagonal of a plot of log signal from one channel plotted against log signal of the other channel. False positives are measured by the extent of the points as plotted from the diagonal.

As input, oversampled probes were selected from A/A experiments on the arrays, and variables were assigned role properties from the three options defined previously, i.e., C, N, or O. The FE names variable, defined as Ln(rDyeNormSignal/gDyeNormSignal) in this example was assigned as a continuous variable, C. Barcode and ProbeName were each assigned as N variables, as was RedGreenTarget.

The output is this example was ProbeName[RedGreenTarget,Barcode] ssqs and Probename[RedGreenTarget,Barcode] dfs, wherein the same nesting annotation as described in Example 2 was used.

Standard regression ANOVA analysis was performed (e.g., as provided by JMP*SAS) of Ln(rDyeNormSignal/gDyeNormSignal) regressed on RedGreenTarget, Barcode [RedGreenTarget], and ProbeName [RedGreenTarget,Barcode].

Based on the ANOVA analysis performed, and the following formula:

$$\text{Ln}R = c + \exp t + \text{array}. \exp t + \text{probe.array}. \exp t + \epsilon,$$
$$\text{Ln}(r\text{DyeNormSignal}/g\text{DyeNormSignal})_{ijkm} = c + \text{Target}_m + \text{array}_i[\text{Target}_m] + \text{Probe}_j[\text{array}_i, \text{Target}_m] + \text{error}_{ijkm},$$

i=1 to 2, j=1 to 100, k=1 to 10, m=1 to 2, where four of the arrays were self-self of A/A arrays (i.e., same target on the probes to be read by both channels of a scanner (e.g., red and green channels), for each probe); and four of the arrays were dye flip arrays (i.e., red target for a probe on one array is "flipped" to a green target, and vice versa) as accounted for by the indices "i" and "m" in the above formula, the following results were obtained:

| effect | DF | Sum of Squares | metric |
|---|---|---|---|
| RedGreenTarget | 1 | 0.240015 | |
| Barcode[RedGreen Target] | 2 | 0.021932 | |
| ProbeName[RedGreen Target,Barcode] | 396 | 60.230476 | false positive– |
| Error | 3600 | 225.53881 | group uniformity neg– |

Variation of log ratio signal among different probes for a given sample and array should be zero for A/A arrays. Residual error is essentially replicate error for each probe, i.e., uniformity.

An F-test of an effect versus error produces a significance value for the group of arrays considered. An F-test of an effect versus the same effect in another array group produces a significance valued between the two groups for that effect.

Example 5

Probe Simple ROC (Receive Operating Characteristics)

An ROC analysis compares the rate of change in a population of true positives (i.e., values are reported as positive and actually are positive) versus simultaneous rate of change of a false positive population (i.e., values are reported as positive but are actually not positive) as the stringency of a criterion that classifies population members varies from very restrictive to non-restrictive. Hence, a curve is created that tracks the population size along each axis, i.e., true positives versus false positives. Each axis can be normalized to a fraction of the total respective population. The ROC curve produces a comparison of sensitivity versus specificity with respect to identification of the positive population. The area under the curve (AUC) is used to score the results as with respect to identification of positives, with the highest possible score being one unit, since each axis ranges from zero to 1 (e.g., see FIG. 7A).

S In this example, a query was addressed as to what was the compromise between sensitivity and specificity in the arrays considered. All biological research probes (i.e., control probes were not considered) were used as input for this example and the variables were assigned according to the three levels defined above, i.e., C, N, and O. The FE names variable, defined in this example as Ln(rDyeNormSignal/gDyeNormSignal) was assigned as a continuous variable, C. The variables RedSample and GreenSample were defined as nominal variables, N, as simply naming whether the particular signal considered was from the red channel or green channel, respectively.

Figure 7A:
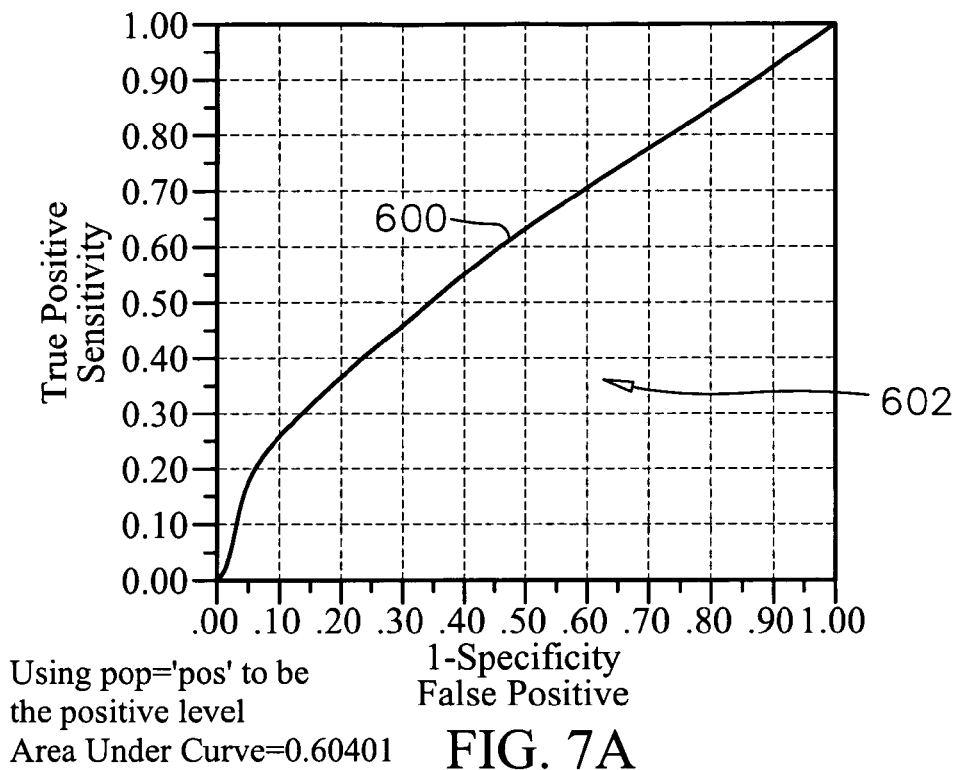
FIG. 7A shows an ROC curve generated from signal data from a chemical array.

The output in this example was the ROC curve 600 shown in FIG. 7A, and the area under curve 600, i.e., AUC 602.

A Rosetta ROC program (Rosetta Resolver®, http://www.rosettabio.com/products/resolver/default.htm) using Ln(rDyeNormSignal/gDyeNormSignal) to count {RedSample=GreenSample} positive samples versus {RedSample=GreenSample} negative samples that pass a threshold as it varies from low to high stringency, such as p-value was performed. The Area-under-curve (AUC) 602 was calculated via the trapezoidal-rule (e.g., see http://mathworld.wolfram.com/TrapezoidalRule.html) as 0.60401, see FIG. 7A.

This analysis assumes that one can access related known negative and positive populations to test the criteria process. Typically, a pure negative population exists, but only approximations to a pure positive population are available. For example, two-color microarray analysis with the same target sample on the array to be read (scanned) by each channel (i.e., a self-self array) produces a negative population of differential gene expression (since the ratio of the same signal to itself is one and the log of one is zero, there is not a positive log ratio signal, and this is considered a member of a negative population), while dissimilar samples in each channel produce a quasi-positive population of differential gene expression since many genes will not change expression between the two samples. Thus, the resulting ROC curve will be distorted.

The present invention corrects or compensates the ROC analysis for such an impure (contaminated) positive population by weighting the positive members by an estimate of the probability that they are likely not members of the negative population (i.e., non-differentially expressed genes). This probability may be estimated by the distribution of the negative population relative to the criteria process. For microarrays, a criterion may be the orthogonal distance of a point from the diagonal on a two-channel plot where each axis represents each channel, respectively, where equal signals on both axes for a point is plotted on the diagonal line.

As noted above, the positive population contains a large population of genes that are members of the negative population (i.e., those genes in which there is no significant differential expression between the two samples). In view of this, one approach uses the probability distribution of the pure negative population to weight points of the positive population, such that very high differential expression values are assigned weighting factors close to one, and very low differential expression values are assigned weighting factors close to zero, with those values in between being assigned weighting factors of $0<wf<1$, where wf=weighting factor. These probabilities may be estimated using any of a number of established statistical methods on negative population libraries and/or databases, e.g., kernel estimators of cumulative distribution functions (CDF's), etc.

Figure 7B:
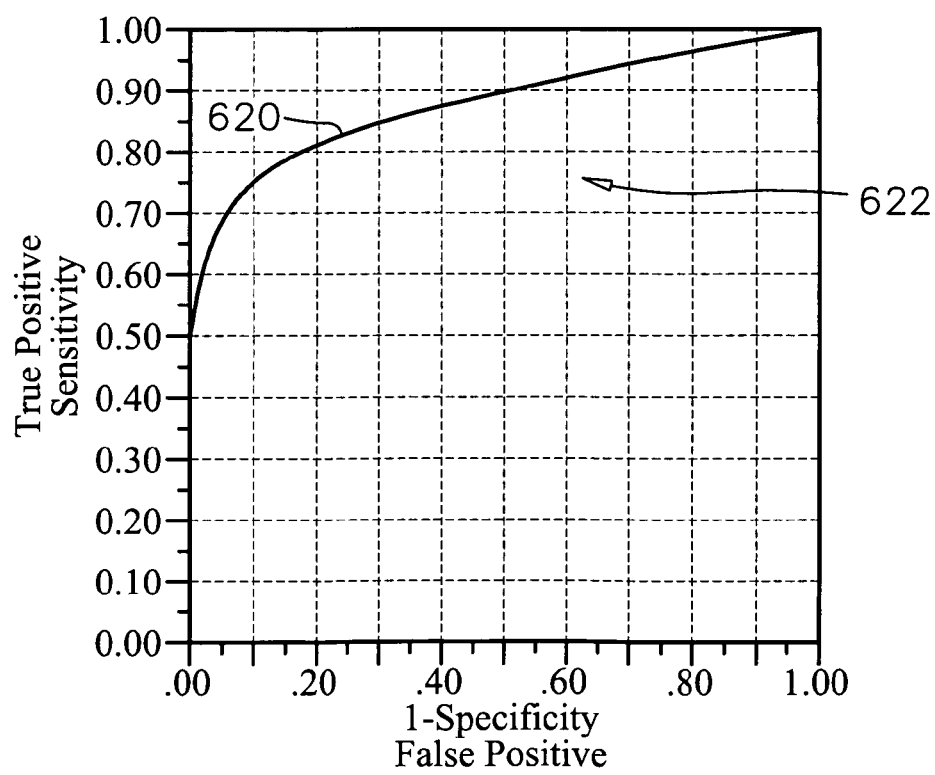
FIG. 7B shows an ROC curve generated from signal data from a chemical array by conventional ROC analysis.
Figure 7C:
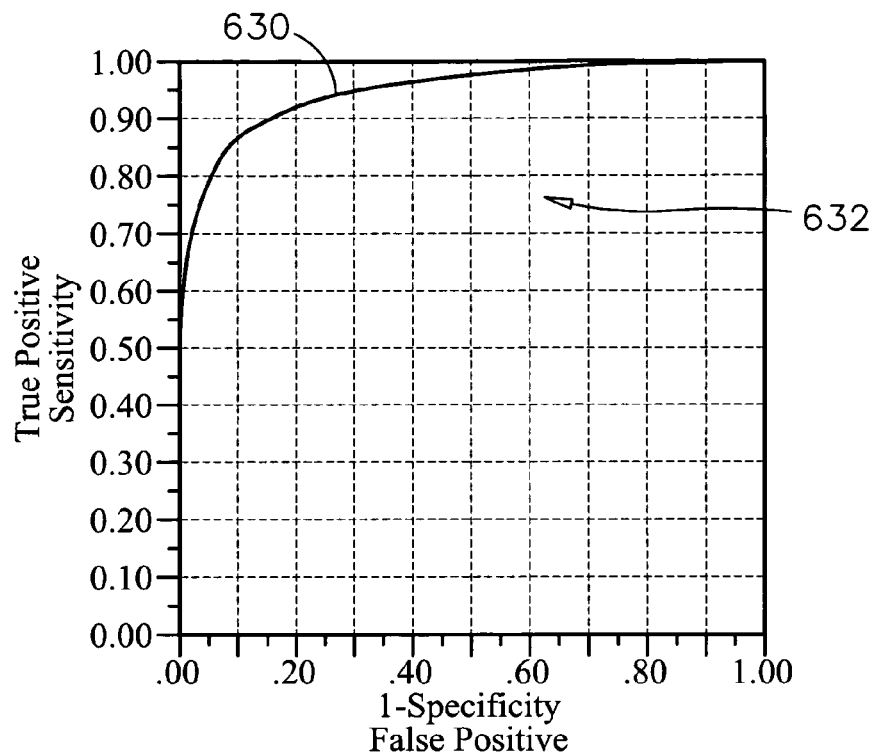
FIG. 7C shows a corrected ROC curve generated from the same signal data used to generate the curve in FIG. 7B, but weighted according to techniques described herein.

The Rosetta Resolver® ROC program was used to perform a weighted ROC analysis setting wf–1 for all members of the pure negative population and using the weighting values as described above for the positive population. It should be noted here that the present invention is not limited to use of the Rosetta Resolver® ROC program, as any software package configured to perform ROC analysis may be used to carry out weighted ROC analysis according to the techniques described herein. FIG. 7B shows the results of the conventional ROC analysis, and FIG. 7C shows, comparatively, the results of the weighted or corrected ROC analysis performed on the same data set. It can be readily appreciated that the corrected ROC curve 630 is less "flattened" than the conventionally processed ROC curve 620, and takes on the characteristics of a ROC curve that has been generated from a population that does not have a contaminated positive population (a contaminated positive population is one that contains false positive members as well as true positive members, while a positive population that is not contaminated contains only true positive members). The AUC 632 thus provides a better and truer approximation of the receiver operating characteristics of the system that processes signals from a chemical array such as a microarray used to generate signal ratios from sequences of first and second samples that bind with probes on the array.

Each position on an ROC curve represents two exhaustive probabilities: one, the probability of event A (e.g., true positive) labeled $P_A$, and two, the probability of event B (e.g., false positive) labeled $P_B$. Assuming a large population with sampling size N for all events, the error variance for P becomes: VP=P(1−P)/N. The two resulting variances are the magnitude squared of the two components of an error vector at each point of the ROC curve. Conditional on a specific position on the curve, the error bars are the plus/minus perpendicular projectors of this error vector at the curve position.

Example 6

Depurination Metric for Complex Biological Assay

Depurination load refers to the product probability that all nucleic acid residues "A" in sequences considered are intact. Give the probe sequence, sequence(s) sequence composition gradients are derived. The sequence composition effect is a compound variable composed of two types: 1) the proportion among all residues that are not complementary to target signal residue, e.g., typically "A", "C" and "T: on the probe when the target label is on "C"; and 2) the count of residue complement to the labeled residue, e.g., "G" on the probe links labeled with "C" target, a fraction of which are actually labeled. Hence, the number of "G" in a probe affects signal strength. The number of "G", not its proportion, in a sequence is thus an ANOVA covariate effect.

A model for characterizing depurination as it occurs in sequences as they are built onto probes of a microarray may be given as follows:

$$S = S_B + Hc_{target}T(l)Y(l+m)Q_{intact} \quad (11)$$

where S is the observed signal, $S_B$ is the background signal, H is a constant, $c_{target}$ is the hybridization target (e.g., Tar25C) concentration, T(l) is the tether enhancement for a tether of length l and Y(l+m) is the full-length oligonucleotide yield after l+m layers (l for the tether, m for the hybridizing probe). If the background is subtracted carefully from S, $S_B$ effectively moves to the left hand side of equation (11).

A statistical model for depurination is provided by the present system, as follows:

$$\mathrm{Ln}(S-S_B) = \mathrm{Ln}H + \mathrm{Ln}c_{target} + \mathrm{Ln}T(l) + \mathrm{Ln}Y(l+m) + \mathrm{Ln}Q_{intact} + SE45 \quad (12)$$

$$\mathrm{Ln}Q_{intact} = dpf \times \mathrm{Ln}[prob(\sim DCA)] \quad (13)$$

where SE45=a signal enhancement as l+m>45; dpf=the calculated depurination dosage for each sequence, which is dependent upon the total number of exposures of every "A" base in a sequence during the build of the sequence; and prob(~DCA)=the probability of A's survival, i.e., 1—the probability "d" that dichloroacetate (DCA) enables cleavage at an "A" base.

Ideally, the value for Ln of the probability that all A's survive (i.e., depurination does not occur) is given by Ln[1−d], typically a small negative value, where d represents the probability that dichloroacetate (DCA) attacks A causing depurination. An estimation can then be given by:

$$\mathrm{Ln}[S-Bk] = dpf*b + \text{otherregressionterms} \quad (14)$$

where "otherregressionterms" signify array ANOVA factors that are typically considered, as has been described above. Optimization of the "b" regression parameter gives the depurination probability.

Figure 8:
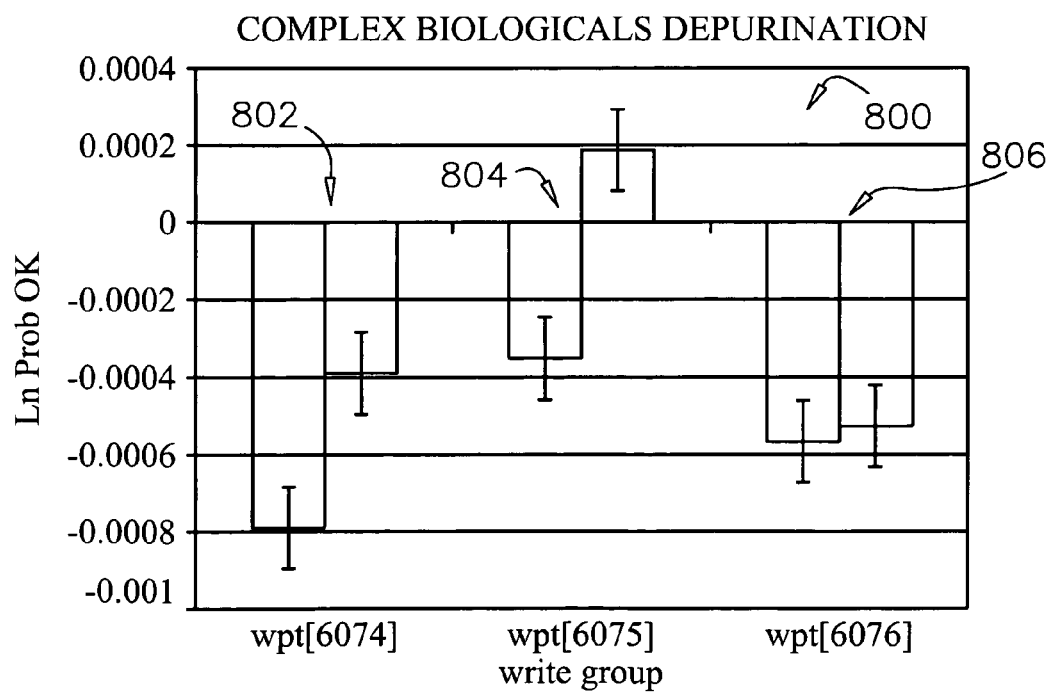
FIG. 8 shows a plot of the log values of negative probabilities that probes having complex biologicals have been depurinated, as calculated by ANOVA estimates of depurination probability as described.

FIG. 8 shows a plot 800 of the log values of probabilities that probes having complex biologicals have not been depurinated (Ln Prob OK), as calculated by ANOVA estimates of depurination probability as described above. Bar graphs (802, 804, 806) for three wafer pairs (i.e., arrays matched to the same writer to avoid writer shifts, wherein each of the wafers of the wafer pair may have multiple arrays thereon, i.e., wpt[6074], wpt[6075], and wpt[6076]) are plotted, showing that those wafers having 4% UDS (a silicon polymer used in making the wafers) produce probes having significantly less depurination than those wafers having 2% UDS. (Note that the rightmost bar of bar pair 804 that shows a positive value is likely due to noise in the system, as all values are expected to be negative). Since the log of (1-a small number)=-small number, the negative of the values of the bar charts give the probability that A will be destroyed during processing (i.e., depurination occurs). Thus the values (parameters) of the ANOVA variable dpf estimates the negative of the probability that A gets clipped (depurinated) during processing. The ANOVA statistics were as follows:

| Statistical Model | |
|---|---|
| Source | Prob>F |
| wpt | 0.0568 |
| UDS[wpt] | <.0001 |
| dpf[wpt] | <.0001 |
| UDS*dpf[wpt] | <.0001 |
| GreenSample | 0.1412 |
| Row&RS | 0.4685 |
| Col&RS | 0.0096 |
| Row*Row | <.0001 |
| Col*Row | <.0001 |
| Col*Col | <.0001 |
| Barcodes&Random | | where wpt is a blocking ANOVA variable that represents the effect of the writers on the variable Ln[S−Bk] (see equation (14)), where the p-value of 0.0568 is right on the borderline for significance, the generally accepted p-value for significance being 0.05 or less. The p-value (Prob>F) estimates the probability that the reported value is due to noise. UDS[wpt] is a variable relating to type of substrate (i.e, UDS=4% or 2%) combined with a particular writer ([wpt]). This factor as well as dpf[wpt] (depurination dose term combined with each writer), and UDS*dpf[wpt] (depurination depending upon the type of substrate on each writer) have high significance (<0.0001). GreenSample accounts for different biological samples and the results show that the p-value (0.1412) is not significant. The second-order response surface variables Row&RS, (row effect part of the response surface) is 0.4865 and therefore the value is consistent with noise. Col&RS (column effect part of the response surface), Row*Row (second order effect of rows), Col*Col (second order effect of columns) and Col*Row (second order crossed effect) are all significant as indicated by the reported p-values. These effects provide a complete ANOVA model of all primary sources of variation in the Ln[S−Bk] variable.

While the present invention has been described with reference to the specific embodiments thereof, it should be understood by those skilled in the art that various changes may be made and equivalents may be substituted without departing from the true spirit and scope of the invention. In addition, many modifications may be made to adapt a particular situation, material, composition of matter, process, process step or steps, to the objective, spirit and scope of the present invention. All such modifications are intended to be within the scope of the claims appended hereto.

That which is claimed is:

1. A method of producing a metric to characterize a chemical array, said method comprising:

quantifying effects of terms impacting results of measurement of an output generated from analysis of the array or a procedure performed using the array by performing ANOVA analysis and calculating sums of squares quantities attributable to each of the terms respectively;

wherein said ANOVA analysis comprises modeling said terms as variables including nominal and/or ordinal variables as well as scalar variables relative to one or more measured outputs according to the equation:

$$XB=Y$$

where

X is a matrix containing rows and columns of data representing the variables;

Y is a vector or matrix with a column for every dependent variable of the measured outputs; and B is the solution matrix or vector containing a column for each response column in Y, that defines the effects of the variables in X;

partitioning columns of X into q mutually exclusive and exhaustive bins of said columns;

iteratively solving for values of the solution matrix of the model for each bin 1 to q for a pass through the entire X matrix; and repeating said iteratively solving for a number of passes until changes in calculated values of the solution matrix B become smaller in magnitude than a predetermined threshold magnitude, or until a preset maximum number of passes have been performed, as necessary to end a cycle convergence;

generating a metric from at least two of said sum of squares quantities; and performing at least one of: outputting said metric and storing said metric in a computer storage device.

2. The method of claim 1, wherein said metric comprises an F-test defined by the equation:

$$F\text{-}stat=(SSQ1/df1)/(SSQ2/df2) \qquad (10)$$

wherein SSQ1 is a first of said at least two of said sum of squares quantities attributable to one of said terms, df1 is a degrees of freedom value characterizing said one of said terms, SSQ2 is a second of said at least two of said sum of squares quantities attributable to a second of said terms, and df2 is a degrees of freedom value characterizing said second of said terms.

3. The method of claim 2, further comprising calculating a p-value of said F-stat.

4. The method of claim 1, comprising performing said quantifying effects step for at least two of said chemical arrays, wherein said metric is generated from at least one of said sum of squares quantities characterizing a first of the at least two arrays, and at least one of said sum of squares quantities characterizing a second of the at least two arrays.

5. The method of claim 4, wherein said metric is generated from one of said sum of squares quantities characterizing a first of the at least two arrays, one of said sum of squares quantities characterizing a second of the at least two arrays, each said one of said sum of squares quantities being attributable to the same term.

6. The method of claim 1, comprising performing said quantifying effects step for a plurality of said chemical arrays; and storing said sums of squares quantities in a database.

7. The method of claim 6, further comprising querying said database, wherein sums of squares quantities are selected from said database, based on said query, said generating being based on said selected quantities.

8. The method of claim 7, wherein said selected quantities include at least two of said sum of squares quantities characterizing one of said chemical arrays.

9. The method of claim 7, wherein said selected quantities include at least one of said sum of squares quantities characterizing one of said plurality of chemical arrays, and at least one of said sum of squares quantities characterizing another of said plurality of chemical arrays.

10. The method of claim 1, wherein said metric measures probability of depurination.

11. A method of characterizing one or more chemical arrays, said method comprising:

querying a database storing sums of squares quantities quantifying effects of terms impacting results of measurements of outputs generated from a plurality of chemical arrays;

selecting at least two sums of squares quantities based on said querying;

generating a metric based on said at least two sums of squares quantities; and outputting said metric, wherein said selecting at least two sums of squares quantities comprises selecting more than two of said sums of squares quantities, each said quantity attributable to the same term, from different ones of the chemical arrays processed.

12. The method of claim 11, wherein said different ones of the chemical arrays were processed at different times; and wherein said generating a metric comprises generating a run chart.

13. The method of claim 11, wherein said generating a metric comprises generating a baseline quantity based on a plurality of said sums of squares quantities, each of said sums of squares quantities being attributable to the same term.

14. The method of claim 11, wherein said generating a metric comprises generating an inter-array metric, wherein at least one of said at least two of said sums of squares quantities is attributable to a term impacting one of said chemical arrays, and at least another of said at least two of said sums of squares quantities is attributable to said term impacting another one of said chemical arrays.

15. The method of claim 11, further comprising quantifying effects of terms impacting results of measurement of an output generated from a chemical array not currently characterized in said database by performing ANOVA analysis and calculating sums of squares quantities not already stored in said database and attributable to each of the terms respectively; and generating a metric based on at least one of said sum of squares quantities not already stored in said database, and at least one of said sum of squares quantities selected from said database.

16. The method of claim 15, further comprising storing said quantities not already stored in said database.

17. A system for producing a metric to characterize a chemical array, said system comprising:

at least one processor configured to quantify effects of terms impacting results of measurement of an output generated from the array by performing ANOVA analysis and calculating sums of squares quantities attributable to each of the terms respectively, wherein said ANOVA analysis comprises modeling said terms as variables including nominal and/or ordinal variables as well as scalar variables relative to one or more measured outputs according to the equation:

XB=Y where
X is a matrix containing rows and columns of data representing the variables;
Y is a vector or matrix with a column for every dependent variable of the measured outputs; and
B is the solution matrix or vector containing a column for each response column in Y, that defines the effects of the variables in X; and
means for generating a metric based on at least two of said sum of squares quantities.

18. A computer readable medium carrying one or more sequences of instructions for producing a metric to characterize a chemical array, wherein execution of one or more sequences of instructions by one or more processors causes the one or more processors to perform the steps of:
quantifying effects of terms impacting results of measurement of an output generated from the array by performing ANOVA analysis and calculating sums of squares quantities attributable to each of the terms respectively, wherein said ANOVA analysis comprises modeling said terms as variables including nominal and/or ordinal variables as well as scalar variables relative to one or more measured outputs according to the equation:

XB=Y where
X is a matrix containing rows and columns of data representing the variables;
Y is a vector or matrix with a column for every dependent variable of the measured outputs; and
B is the solution matrix or vector containing a column for each response column in Y, that defines the effects of the variables in X;
generating a metric using at least two of said sum of squares quantities; and
performing at least one of: outputting said metric and storing said metric in a computer storage device.

19. A computer readable medium carrying one or more sequences of instructions for characterizing one or more chemical arrays, wherein execution of one or more sequences of instructions by one or more processors causes the one or more processors to perform the steps of:
querying a database storing sums of squares quantities quantifying effects of terms impacting results of measurements of outputs generated from a plurality of chemical arrays;
selecting at least two sums of squares quantities based on said querying; and
generating a metric using said at least two sums of squares quantities; and
outputting said metric,
wherein said selecting at least two sums of squares quantities comprises selecting more than two of said sums of squares quantities, each said quantity attributable to the same term, from different ones of the chemical arrays processed.

20. A method of producing &metric to characterize a chemical array, said method comprising:
quantifying effects of terms impacting results of measurement of an output generated from analysis of the array or a procedure performed using the array by performing ANOVA analysis and calculating sums of squares quantities attributable to each of the terms respectively;
generating a metric from at least two of said sum of squares quantities, wherein said metric comprises an F-test defined by the equation:

$$F\text{-}stat=(SSQ1/df1)/(SSQ2/df2) \qquad (10)$$

wherein SSQ1 is a first of said at least two of said sum of squares quantities attributable to one of said terms, df1 is a degrees of freedom value characterizing said one of said terms, SSQ2 is a second of said at least two of said sum of squares quantities attributable to a second of said terms, and df2 is a degrees of freedom value characterizing said second of said terms; and
performing at least one of: outputting said metric and storing said metric in a computer storage device.

21. The method of claim 20, wherein said ANOVA analysis comprises modeling said terms as variables including nominal and/or ordinal variables as well as scalar variables relative to one or more measured outputs according to the equation:

XB=Y where
X is a matrix containing rows and columns of data representing the variables;
Y is a vector or matrix with a column for every dependent variable of the measured outputs; and
B is the solution matrix or vector containing a column for each response column in Y, that defines the effects of the variables in X;
partitioning columns of X into q mutually exclusive and exhaustive bins of said columns;
iteratively solving for values of the solution matrix of the model for each bin 1 to q for a pass through the entire X matrix; and
repeating said iteratively solving for a number of passes until changes in calculated values of the solution matrix B become smaller in magnitude than a predetermined threshold magnitude, or until a preset maximum number of passes have been performed, as necessary to end a cycle convergence.

22. The method of claim 20, comprising performing said quantifying effects step for at least two of said chemical arrays, wherein said metric is generated from at least one of said sum of squares quantities characterizing a first of the at least two arrays, and at least one of said sum of squares quantities characterizing a second of the at least two arrays.

23. A method of producing a metric to characterize a chemical array, said method comprising:
quantifying effects of terms impacting results of measurement of an output generated from analysis of the array or a procedure performed using the array by performing ANOVA analysis and calculating sums of squares quantities attributable to each of the terms respectively;
generating a metric from at least two of said sum of squares quantities; and
performing at least one of: outputting said metric and storing said metric in a computer storage device,
wherein said quantifying effects step is performed for at least two of said chemical arrays, wherein said metric is generated from at least one of said sum of squares quantities characterizing a first of the at least two arrays, and at least one of said sum of squares quantities characterizing a second of the at least two arrays.

24. The method of claim 23, wherein said metric is generated from one of said sum of squares quantities characterizing a first of the at least two arrays, one of said sum of squares quantities characterizing a second of the at least two arrays, each said one of said sum of squares quantities being attributable to the same term.

25. A method of characterizing one or more chemical arrays, said method comprising:
  querying a database storing sums of squares quantities quantifying effects of terms impacting results of measurements of outputs generated from a plurality of chemical arrays;
  selecting at least two sums of squares quantities based on said querying;
  generating a metric based on said at least two sums of squares quantities;
  quantifying effects of terms impacting results of measurement of an output generated from a chemical array not currently characterized in said database by performing ANOVA analysis and calculating sums of squares quantities not already stored in said database and attributable to each of the terms respectively;
  generating a metric based on at least one of said sum of squares quantities not already stored in said database, and at least one of said sum of squares quantities selected from said database; and
  performing at least one of outputting said metric and storing said metric.

* * * * *